(12) United States Patent
Hofmann et al.

(10) Patent No.: US 7,281,060 B2
(45) Date of Patent: Oct. 9, 2007

(54) COMPUTER-BASED PRESENTATION MANAGER AND METHOD FOR INDIVIDUAL USER-DEVICE DATA REPRESENTATION

(75) Inventors: Ralf Hofmann, Hamburg (DE); Torsten Schulz, Pinneberg (DE); Bernd Eilers, Hamburg (DE); Thomas Pfohe, Hamburg (DE)

(73) Assignee: Sun Microsystems, Inc., Palo Alto, CA (US)

( * ) Notice: Subject to any disclaimer, the term of this patent is extended or adjusted under 35 U.S.C. 154(b) by 511 days.

(21) Appl. No.: 09/759,744

(22) Filed: Jan. 12, 2001

(65) Prior Publication Data

US 2001/0009016 A1    Jul. 19, 2001

(30) Foreign Application Priority Data

Jan. 14, 2000    (EP)    ................................ 00100740

(51) Int. Cl.
*G06F 15/16* (2006.01)
*G06F 15/00* (2006.01)

(52) U.S. Cl. ...................... 709/246; 709/203; 709/219; 715/513

(58) Field of Classification Search ........ 709/201–203, 709/217–220, 227–231, 238, 246, 250, 24, 709/236; 715/513
See application file for complete search history.

(56) References Cited

U.S. PATENT DOCUMENTS

| | | | |
|---|---|---|---|
| 5,727,159 A | 3/1998 | Kikinis | 395/200.76 |
| 5,809,415 A | 9/1998 | Rossmann | 455/422 |
| 5,826,062 A * | 10/1998 | Fake et al. | 715/513 |
| 6,300,947 B1 * | 10/2001 | Kanevsky | 345/333 |
| 6,421,733 B1 * | 7/2002 | Tso et al. | 709/246 |

(Continued)

FOREIGN PATENT DOCUMENTS

EP    0 908 832 A2    4/1999

(Continued)

OTHER PUBLICATIONS

N. Freed, N. Borenstein, Network Working Group, Request for Comments: 2045, "Multipurpose Internet Mail Extensions (MIME) Part One: Format of Internet Message Bodies", Nov. 1996.*

(Continued)

*Primary Examiner*—Glenton B. Burgess
*Assistant Examiner*—Yasin M Barqadle
(74) *Attorney, Agent, or Firm*—Gunnison, McKay & Hodgson, L.L.P.; Forrest Gunnison

(57) ABSTRACT

Access to external service providers is provided through portlets, where each portlet accessible by a user is represented on the display of the user device. Through use of a dynamic content channel, e.g., a portlet, a highly customizable content page may be produced for any individual client system. When a portlet is selected on a user device, the content associated with the portlet is retrieved and automatically transformed into data that can be displayed by that user device. Thus, a particular user device is not limited to accessing content in a format identical to that associated with the user interface in use on the user device. Consequently, the user's ability to access a wide variety of content sources independent of the characteristics of the particular user device is further enhanced.

6 Claims, 30 Drawing Sheets

U.S. PATENT DOCUMENTS

| | | | |
|---|---|---|---|
| 7,072,932 B1 * | 7/2006 | Stahl | 709/219 |
| 2001/0039540 A1 | 11/2001 | Hoffmann et al. | 707/3 |

FOREIGN PATENT DOCUMENTS

| | | |
|---|---|---|
| EP | 0 969 389 A2 | 1/2000 |
| EP | 09 69389 A2 | 1/2000 |
| WO | WO96 37817 A1 | 11/1996 |
| WO | WO 96 37817 A1 | 11/1996 |
| WO | WO 98 24020 A2 | 6/1998 |
| WO | WO98 24020 A2 | 6/1998 |
| WO | WO98 53393 A1 | 11/1998 |
| WO | WO 98 53393 A1 | 11/1998 |
| WO | WO 00 20985 A1 | 4/2000 |

OTHER PUBLICATIONS

Eric Miller, "An Introduction to the Resource Description Framework", D-Lib Magazine, ISSN 1082-9873, May 1998.*

Extensible Stylesheet Language (XSL) Specification, W3C Working Draft Apr. 21, 1999, Editor: Stephen Deach, Adobe Systems Inc. pp. 1, 16, and 17 (Abstract, Section 1.2).*

RFC 2068, Fielding et al.*

Johnson, D., "Converting PC GUIs for NonPC Devices", Circuit Cellar Ink, Vernon, CT, vol. 91, Feb. 1998, pp. 40-42, 44-45, XP000852859.

Java™ 2 Platform Enterprise Edition Specification, Version 1.2, Final Release, Sun Microsystems, Inc., Palo Alto, CA, Dec. 17, 1999.

JavaServer Pages™ Specification, Version 1.1, Sun Microsystems, Inc., Palo Alto, CA, Nov. 30, 1999.

Java™ Servlet Specification, Version 2.2, Final Release Sun Microsystems, Inc., Palo Alto, CA, Dec. 17, 1999.

Bickmore et al., "Web Page Filtering and Re-Authoring for Mobile Users," Computer Journal, Oxford University Press for British Computing Society, vol. 42, No. 6, pp. 534-546, 1999.

Schmidt Y. et al., "Erfahrungen Mit VDN Bei Der Uebersetzungskonstruktion, Experiences with VDM in Compiler Construction", Informationstechnik IT, de, Oldenbourg Verlag. Munchen, vol. 29, No. 4, Jan. 1, 1987, p. 211-216, XP002063424.

Johnson, D., "Converting PC GUIs for Non PC Devices", Circuit Cellar Ink, Vernon, CT, vol. 91, Feb. 1998, pp. 40-42, 44-45, XP000852859.

Zeiger, Stefan, "Servlet Essentials", Nov. 4, 1999, http://www.novocode.com/doc/servlet-essentials/.

"Announcement: SAX—Simple API for XML (Jan. 12, 1998 Draft)", p. 1, http://www.oasis-open.org/cover/SAXAnn980112.html.

Garshol, L., "Free XML Software", Dec. 15, 1999, pp. 1-53, http://horizon.nserl.purdue.edu/Xml/XMLtools.html.

"New SAXON Release (3.03)", Sep. 1, 1998, pp. 1-2, http://xml.coverpages.org/saxon980901.html.

St. Laurent, S., "Toward a Layered Model for XML," (C) 1999, pp. 1-17, http://www.simonstl.com/articles/layering/layered.htm.

Wallace, M. and Runciman, C., "Haskell and XML: Generic Combinators or Type-Based Translation?" ICFP'99 Sep. 1999, ACM, pp. 148-159.

"XT extension mechanism", Jan. 2, 1999, pp. 1-2, http://www.oasis-open.org/cover/xt-extension199901.html.

No author, "A History of Browsers", Aug. 8, 2004, http://www.quirksmode.org/browsers/history.html.

* cited by examiner

```java
public class PortletManager extends HTTPServlet
{
*//This method provides information about a servlet used as portlet manager to a user device. In this example the method returns the name of the
servlet and a copyright notice./*
    public String getServletInfo()
    {
        return "Channel Manager - Copyright 2000 Sun Microsystems, Inc.";
    }
*//
This method is called when the webserver (HTTP server) loads the servlet. It is only called once for the purpose of initialization. In this case
configuration path names are loaded to the XSL and XML files.
/*
    public void init(ServletConfig configuration)
        throws ServletException
    {
        System.out.println(getServletInfo());
        super.init(configuration);
        m_aServletContext=configuration.getServletContext();
        m_aServletContext=getServletContext();
        String sRootBase   =null;
        String sXslBase    =null;
        String sUserBase   =null;
        String sNoUserName =null;
        try
        {
            sRootBase   = new String (getInitParameter("rootbase-uri"));
            sXslBase    = new String (getInitParameter("xslbase-uri"));
            sUserBase   = new String (getInitParameter("userbase-uri"));
            sNoUserName = new String(getInitParameter("nouser-name"));
        }
        catch (Exception e)
        {
            System.err.println("some required init parameter is missing");
            throw new ServletException("init parameter missing");
        }
        ...
```

FIG. 6

```
/*The doPost method is called every time a HTTP post request arrives at the web server with a request for an URL for which the servlet was
configured initially. Post requests are handled in the same method where get requests are handled, so the doGet() method is called.*/
    public void doPost(HttpServletRequest request,
                HttpServletResponse response)
        throws ServletException, IOException
    {
        doGet(request, response);
    }
/*The doGet method is called every time a HTTP get request arrives at the webserver with a request for an URL for which the servlet was
configured.*/
    public void doGet(HttpServletRequest aHttpServletRequest,
                HttpServletResponse aHttpServletResponse)
        throws ServletException, IOException
    {
        try
        {
/*A string is formed which specifies the URL of the servlet based on the information coming with the request. This string can later be used to
specify the servlet as target for a HTTP-request. This will be done once, because this URL can only change if the configuration of the webserver
changes. In the latter case the servlet would be unloaded and loaded again.*/
            // do it only once
            if(m_sPrefixPath.length()==0)
            {
                // build prefix path (e.g. www.sun.com:8088/portal/CM/)
                String sHostName = "";
                String sContextPath = "";
                String sServletPath = "";

// get host name part
                sHostName = aHttpServletRequest.getHeader("Host");
                if ((sHostName==null) || (sHostName.length()==0))
                {
                    sHostName = aHttpServletRequest.getServerName() +
                        ":" +
                        aHttpServletRequest.getServerPort();
                } sContextPath=getContextPath(aHttpServletRequest, new Object[0]);
```

FIG. 7A

```
sServletPath = aHttpServletRequest.getServletPath();   // get servlet path part
m_sPrefixPath = "http://" + sHostName + sContextPath;
m_aDataFacade.setContextPath(m_sPrefixPath);
m_sPrefixPath += sServletPath;                          // concat
m_aDataFacade.setPrefixPath(m_sPrefixPath);             // set path on DataFacade m_aCommandFactory = new CommandFactory();               // new command factory /**The actual work for resolving the request is done by separate objects. For each command specified in the URL given in the request a new
object is instanced which is responsible to resolve the request. This approach is based on a design pattern called the "Command"-pattern. In the
current realization there are the commands "load", "save", "article" and "channel". The object associated with each command is instantiated by
class CommandFactory.
*/

// get command pattern and execute
        Command aCommand =
            m_aCommandFactory.produceCommand(aHttpServletRequest);
        aCommand.execute(aHttpServletRequest, aHttpServletResponse, m_aDataFacade);
    }
    catch (Exception e)
    {
        e.printStackTrace(System.out);
    }
}

...
private ChannelHook      m_aChannelHook      =null;
private CommandFactory   m_aCommandFactory   =null;
private DataFacade       m_aDataFacade       =null;
private ServletContext   m_aServletContext   =null;
private String           m_sPrefixPath       ="";
}
```

FIG. 7B

```
/*The class CommandFactory parses the head of the specified URL for the request for a command, e.g.,"channel". If a known command is
recognized, the associated command object is created.*/
public class CommandFactory
{
    public Command produceCommand(ServletRequest aRequest)
        throws ServletException
    {
        Command aCommand=null;
        String  sUrl    =null;
        //The following method makes sure that this is an HTTP request and gets the URL out of the request.
        if(aRequest instanceof HttpServletRequest)
        {
            HttpServletRequest sHttpServletRequest=(HttpServletRequest) aRequest;
            sUrl=sHttpServletRequest.getPathInfo();
        }
        else
        {
            throw new ServletException("Request is not of type HttpServletRequest");
        }
        /*The following method tries to recognize the recent command by comparing the head of the URL with the known set of commands. If a known
        command is found, the associated class is instanced and this instance is returned to the caller.*/
        //careful: sort order of if clauses is important
        if(sUrl != null)
        {
            if(sUrl.startsWith(CHANNEL))
            {
                aCommand = new ChannelCommand();
            }
            if(sUrl.startsWith(ARTICLE))
            {
                aCommand = new ChannelCommand();
            }
            else if(sUrl.startsWith(LOAD))
            {
                aCommand = new LoadCommand();
            }
            else if(sUrl.startsWith(SAVE))
```

FIG. 8A

```
        aCommand = new SaveCommand();
        System.out.println("- new SaveCommand");
    }
    }
    if(aCommand == null)
        throw new ServletException("Factory cant produce command for URL" + sUrl);

return aCommand;
} public final static String LOAD    = "/load";
public final static String CHANNEL = "/channel";
public final static String ARTICLE = "/article";
public final static String SAVE    = "/save";

```
public class LoadCommand extends Command
{
    public void execute(ServletRequest aRequest, ServletResponse aResponse, DataFacade aDataFacade)
        throws ServletException
    {
        try
        {
            String          sSessionId          = getSessionId(aRequest);
            String          sURL                = aRequest.getParameter("href");
            String          sPreferredMimeType  = aRequest.getParameter("Mime");
            String          sDevice             = aRequest.getParameter("Device");
            String          sXSL                = aRequest.getParameter("XSL");
            String          sMatch              = aRequest.getParameter("match");
            String          sPath               = null;
            String          sKey                = null;
            String          sValue              = null;
            Enumeration     aParameterList      = aRequest.getParameterNames();
            Hashtable       aXSLParameters      = new Hashtable();
            XmlDocument     dFilteredDoc        = null;
            boolean         bFound              = false;
            if(sMatch == null || sMatch.equals(""))
            {

/* this should only be done if there is ONLY one other parameter other than Mime, Device or XSL because the order in the Enumeration is NOT
                deterministic and does not equal the order of parameters in the request */
                while (aParameterList.hasMoreElements() && (!bFound))
                {
                    sKey = (String) (aParameterList.nextElement());
                    if (((!sKey.equals("Mime")) &&
                         (!sKey.equals("Device")) &&
                         (!sKey.equals("XSL")) )
                    {
                        bFound = true;
                        sValue = aRequest.getParameter(sKey);
                    }
                }
            }
            else
            {

/* if there are more parameters the user should set a match parameter to select the key to be used */
```

FIG. 9A

```
sKey = sMatch;
sValue = aRequest.getParameter(sKey);
bFound = true;

if(!bFound || (sKey.equals("href") && (sValue == null || sValue.equals("root"))) )
{
    sKey="href";
    sValue=(new URL(aDataFacade.getRootBase())).toString();
}
// todo: better
if      (sKey.equals("href"))         {sPath = "Portlet/@";}
else if (sKey.equals("subscribed"))   {sPath = "Portlet/@";}
else if (sKey.equals("class"))        {sPath = "PortletUserDevice/@";}
else if (sKey.equals("context"))      {sPath = "PortletUserDevice/@";}
else if (sKey.equals("sticky"))       {sPath = "PortletUserDevice/@";}
else if (sKey.equals("floating"))     {sPath = "PortletUserDevice/@";}
else if (sKey.equals("rollup"))       {sPath = "PortletUserDevice/@";}
else if (sKey.equals("minimized"))    {sPath = "PortletUserDevice/@";}
else if (sKey.equals("maximized"))    {sPath = "PortletUserDevice/@";}
else if (sKey.equals("sizeable"))     {sPath = "PortletUserDevice/@";}
else                                   {sPath = "PortletUserDevice/parameter";}
if (sPath!=null)
{
    aFilteredDoc = aDataFacade.getFilteredDoc(sSessionId, sPath, sKey, sValue);
}
XMLResolver aXMLResolver = new XMLResolver(true);
aXMLResolver.registerCatalogEntries("com.sun.star.portal.portlet.manager.dtd");
if(sXSL.equals("none"))
{
    String sSystemId = "PortletsAll.dtd";
    String sPublicId = aXMLResolver.getPublicId(sSystemId);
    sSystemId = aDataFacade.getPrefixPath()+"/dtd/PortletsAll.dtd";
    aFilteredDoc.setDoctype(sPublicId, //public identifier
        sSystemId,     //system identifier
        null);         //no internal subset
}
//write it
if (aResponse instanceof HttpServletResponse)
    ((HttpServletResponse)aResponse).setHeader("Cache-Control","no-cache");//HTTP1.1
```

FIG. 9B

```
((HttpServletResponse)aResponse).setHeader("Pragma","no-cache");    //HTTP1.0
    OutputStream aOutStream = aResponse.getOutputStream();
    aResponse.setContentType(sPreferredMimeType);
    aFilteredDoc.write(aOutStream);
    aOutStream.flush();
    return;
}
//build path for xsl file which generates response
if((sPreferredMimeType==null) || (sPreferredMimeType.length()==0))
{
    // no mime parameter set so get it via portal servlet
    sPreferredMimeType = aDataFacade.getPreferredMimeType(sSessionId);
}
if((sDevice==null) || (sDevice.length()==0))
{
    // no device parameter set so get it via portal servlet
    sDevice = aDataFacade.getDeviceName(sSessionId);
}
if((sXSL==null) || (sXSL.length()==0))
{
    // no XSL parameter so set direct
    sXSL = "PortletsAll.xsl";
}
else
{
    // if no .xsl extension, add one
    if (sXSL.indexOf(".")==-1)
        sXSL = sXSL+".xsl";
}
// build first chance path to xsl file
URL         aTempURL    = new URL(aDataFacade.getXSLBase());
String sXSLBase         = aTempURL.getFile();
String sSubMime         = sPreferredMimeType.substring(sPreferredMimeType.indexOf("/")+1);
File    aXSLMime        = new File(sXSLBase, sSubMime);
File    aXSLDevice      = new File(aXSLMime, sDevice);
File    aXSLFull        = new File(aXSLDevice, sXSL);
```

FIG. 9C

```
if(!aXSLFull.exists())
{
    // first chance xsl file not there build second chance (no device specific transformation)
    aXSLFull = new File(aXSLMime, sXSL);
    if(!aXSLFull.exists())
    {
        // no xsl found -> error
        throw new ServletException("+++xsl file not found!!!");
    }
}
aXSLParameters.put("TransformURL",aXSLFull.toURL().toString());
//build parse environment
ValidatingParser      aValParser            = new ValidatingParser(false);
XmlDocumentBuilder    aDocBuilder           = new XmlDocumentBuilder();
XSLTransformEngine    aTransformer          = new XSLTransformEngine();
XmlDocument           aSourceDoc            = new XmlDocument();
XmlDocument           aTransformerDoc       = new XmlDocument();
XmlDocument           aDrainDoc             = new XmlDocument();
// get/config parser and builder
aValParser.setDocumentHandler(aDocBuilder);
aDocBuilder.setParser(aValParser);
aValParser.setEntityResolver(aXMLResolver);
aDocBuilder.setDisableNamespaces (false);
// parse xsl file
InputSource aTransInputSource = new InputSource(aXSLFull.toURL().toString());
aValParser.parse(aTransInputSource);
aTransformerDoc = aDocBuilder.getDocument();
aTransformerDoc = aDataFacade.setParameters(aTransformerDoc, aRequest, aXSLParameters);
// transform
aTransformer.createTransform(aTransformerDoc)
    .transform(aFilteredDoc,aDrainDoc);

TreeWalker  aTreeWalker     = new TreeWalker(aTransformerDoc.getDocumentElement());
Element     aWalkerElement  = null;
String      sPublicId       = "";
String      sSystemId       = "";
// set doctype (due to error in XT, which doesnt care for xsl:output if DOM tree is emitted)
while ((sPublicId.equals("") && ((aWalkerElement = aTreeWalker.getNextElement("xsl:output")) != null))
```

FIG. 9D

```
            sPublicId = aWalkerElement.getAttribute("doctype-public");
        }
        aTreeWalker.reset();
        while((sSystemId.equals("")) && ((aWalkerElement = aTreeWalker.getNextElement("xsl:output")) != null))
        {
            sSystemId = aWalkerElement.getAttribute("doctype-system");
        }
        aDrainDoc.setDoctype(   sPublicId,      // public identifier
                                sSystemId,      // system identifier
                                null);                      // no internal subset // write it
        if(aResponse instanceof HttpServletResponse)
        {
            ((HttpServletResponse)aResponse).setHeader("Cache-Control","no-cache");   //HTTP1.1
            ((HttpServletResponse)aResponse).setHeader("Pragma","no-cache");          //HTTP1.0
        }
        OutputStream aOutStream = aResponse.getOutputStream();
        aResponse.setContentType(sPreferredMimeType);
        aDrainDoc.write(aOutStream);
        aOutStream.flush();
    }
    catch (TransformException e)
    {
        e.printStackTrace();
        throw new ServletException("LoadCommand - TransformException");
    }
    catch (SAXException e)
    {
        e.printStackTrace(System.out);
        throw new ServletException("LoadCommand - SAXException");
    }
    catch (IOException e)
    {
        e.printStackTrace(System.out);
        throw new ServletException("LoadCommand - IOException");
    }
}
```

FIG. 9E

```java
public class SaveCommand extends Command
{
    public void execute(ServletRequest   aRequest,
                        ServletResponse  aResponse,
                        DataFacade       aDataFacade)
    throws ServletException
    {
        String        sSessionId     = getSessionId(aRequest);
        String        sURL           = aRequest.getParameter("href");
        Enumeration   aParameterList = aRequest.getParameterNames();
        while (aParameterList.hasMoreElements())
        {
            String sPath = null;
            String sKey  = (String) (aParameterList.nextElement());
            if(!sKey.equals("href"))
            {
                String sValue = aRequest.getParameter(sKey);
                //todo: better
                if      (sKey.equals("title"))      {sPath = "Portlet/";}
                else if (sKey.equals("login"))      {sPath = "Portlet/";}
                else if (sKey.equals("password"))   {sPath = "Portlet/";}
                else if (sKey.equals("subscribed")) {sPath = "Portlet/@";}
                else if (sKey.equals("upper-left-x")){sPath = "PortletUserDevice/";}
                else if (sKey.equals("upper-left-y")){sPath = "PortletUserDevice/";}
                else if (sKey.equals("width"))      {sPath = "PortletUserDevice/@";}
                else if (sKey.equals("height"))     {sPath = "PortletUserDevice/@";}
                else if (sKey.equals("context"))    {sPath = "PortletUserDevice/@";}
                else if (sKey.equals("sticky"))     {sPath = "PortletUserDevice/@";}
                else if (sKey.equals("floating"))   {sPath = "PortletUserDevice/@";}
                else if (sKey.equals("rollup"))     {sPath = "PortletUserDevice/@";}
                else if (sKey.equals("minimized"))  {sPath = "PortletUserDevice/@";}
                else if (sKey.equals("maximized"))  {sPath = "PortletUserDevice/@";}
                else if (sKey.equals("sizeable"))   {sPath = "PortletUserDevice/@";}
                else                                {sPath = "PortletUserDevice/parameter";} //todo:rollback
                if (sPath!=null)
                {
                    aDataFacade.setValue(sSessionId, sURL, sPath, sKey, sValue);
                }
            }
        }
    }
}
```

FIG. 10A

```
// every request needs a response, so I write "OK" as answer for a save request
try {

HttpServletResponse aHttpResponse = (HttpServletResponse)aResponse;
    PrintWriter         aPrintWriter  =aResponse.getWriter();
    String              sAnswer       = new String("<HTML>OK</HTML>");
    aHttpResponse.setContentType("text/html");
    aHttpResponse.setContentLength(sAnswer.length());
    aHttpResponse.setDateHeader("Last-Modified", System.currentTimeMillis());
    aHttpResponse.setHeader("Cache-Control", "no-cache");  //HTTP1.1
    aHttpResponse.setHeader("Pragma", "no-cache");          //HTTP1.0
    aPrintWriter.write(sAnswer);
    aPrintWriter.flush();
}
catch (IOException e) {
    e.printStackTrace();
    throw new ServletException("SaveCommand - IOException");
}
```

FIG. 10B

```
/*The ChannelCommand has to provide the content of a portlet as a response to a request. The ChannelCommand is derived from the class
Command, which is necessary, because of the use of the „Command"-pattern.
*/
public class ChannelCommand extends Command public void execute(ServletRequest aRequest, ServletResponse aResponse, DataFacade aDataFacade)
        throws ServletException
    {
        InputStream     aDocInputStream    = null;
        InputSource     aDocInputSource    = null;
        InputSource     aTransInputSource  = null;
        URLConnection   aURLConnection     = null;
        String          sSessionId         = getSessionId(aRequest);
        String          sEncodedURL        = aRequest.getParameter("href");
        String          sPreferredMimeType = aRequest.getParameter("Mime");
        String          sDevice            = aRequest.getParameter("Device");
        String          sXSL               = aRequest.getParameter("XSL");
        String          sDecodedURL        = "";
        String          sResponseContent   = "";
        Hashtable       aXSLParameters     = new Hashtable();
        try
        {
            /*If no portlet is specified in the URL information about all available portlets is returned. This will be decided by checking the URL for any
            additional information. The information about all available portlets is received from a data container called DataFacade. This concept is based
            on the design pattern Façades.
            */
            //set URL for root channel list
            if((sEncodedURL==null)||
               (sEncodedURL.equals(""))||
               (sEncodedURL.equals("root")) )
            {
                sDecodedURL = aDataFacade.getRootBase();
            }
            else
            {
                sDecodedURL = URLDecoder.decode(sEncodedURL);
            }
```

FIG. 11A

```
/*The part in the URL which specifies the Portlets is an URL which can be used to retrieve the content of the Portlet. This will be used to build
a corresponding URL object, which will be used later on to build an URLconnection.
*/
        //get URL connection
        URL aURL = new URL(sDecodedURL);
        aURLConnection = aURL.openConnection();
        aURLConnection.setUseCaches(false);
        aXSLParameters.put("ProviderURL", aURL.toString());

/*In the following method, all additional fields which are specified in the request, are copied to the new request. These fields can include, for
example, the name of the browser used on the client side, that means in the user device.
*/
        // tunnel properties
        java.util.Enumeration aHeaderNameList = ((HttpServletRequest) aRequest).getHeaderNames();
        while (aHeaderNameList.hasMoreElements())
        {
            String sKey   =(String) aHeaderNameList.nextElement();
            String sValue =((HttpServletRequest) aRequest).getHeader(sKey);
            aURLConnection.setRequestProperty(sKey, sValue);
        }

/*The additional MIME types, which are supported by the portlet manager, are added to a list of accepted MIME types and this list will be added
to the new request.
*/
        // set own mime types, because some devices accept some mime types which make them crash...
        String sSupportedMimeTypes = aDataFacade.getSupportedMimeTypes(sSessionId);
        aURLConnection.setRequestProperty("accept", sSupportedMimeTypes);

/*The provider of the portlet content is connected and the respective content is read out by using an InputStream
*/
        //get connection to URL
        aURLConnection.connect();
        InputStream aProviderResponse = aURLConnection.getInputStream();

/*In case of a HTTP connection the information in the HTTP header can be used to recognize the MIME type of the response. If the HTTP
protocol is not used, the extension of the specified URL is checked.
*/
        if (aURL.getProtocol().equals("http"))
        {
            // get content type
            sResponseContent = aURLConnection.getContentType();
        }
        else
```

FIG. 11B

```
/*If it is recognized that a XML file is requested, it is tried to guess which kind of XML file it is by analyzing the DOCTYPE field in the header
of the XML file. In the case that an XML file based on a certain DTD is recognized, the response type is set to the associated name.
*/

// protocol is not http, so get content via file
    is(sDecodedURL.endsWith(".xml"))
    {
        //seems to be an xml file, so get doctype content
        aProviderResponse.mark(1024);
        byte[] aBuffer=new byte[1000];
        aProviderResponse.read(aBuffer);
        aProviderResponse.reset();
        String aSearchString=new String(aBuffer);
        int nDoctypePosition=aSearchString.indexOf("<DOCTYPE");
        if(nDoctypePosition==-1)
        {
            //unknown xml, send as binary
            sResponseContent="";
        }
        else
        {
            // found "doctype",determine doctype
            String aTokenizerFeed=aSearchString.substring(nDoctypePosition);
            StringTokenizer aTokenizer=new StringTokenizer(aTokenizerFeed," ");
            // get doctype
            aTokenizer.nextToken();
            String sResult=aTokenizer.nextToken();
            if(sResult.equals("Channels"))
                sResponseContent="text/vnd.sun.xml.Channels";
            else if(sResult.equals("Article"))
                sResponseContent="text/vnd.sun.xml.Article";
            else
                //unknown xml, send as binary
                sResponseContent="";
        }
    }
```

FIG. 11C

```
      }
    else
    {
/*If it is not a XML file, the class URLconnection guesses the content type of the response stream.
*/
      //no xml file, so start guessing
      sResponseContent=aURLConnection.guessContentTypeFromStream(
                                      aProviderResponse);
      if (sResponseContent==null)
      {
        //okay, now I'm helpless
        sResponseContent="";
      }
    }
    aXSLParameters.put("ProviderMimeType", sResponseContent);
    // xml response?
    if (!sResponseContent.startsWith("text/vnd.sun.xml."))
    {
/*If the response content is not in a XML format handled by the portlet manager, the response is returned as response to the original request
without any modification.
*/
      // upps, no xml, so simply tunnel through as raw data
      aResponse.setContentType(sResponseContent);
      if (aResponse instanceof HttpServletResponse)
      {
        ((HttpServletResponse) aResponse).setDateHeader("Last-Modified", System.currentTimeMillis());
      }
/*The input stream of the response is copied to the output stream of the response of the original request.
*/
      InputStream  aURLConnectionInStream = aProviderResponse;
      OutputStream aResponseOutStream =
        aResponse.getOutputStream();
          byte[] aBuffer    =new byte[1024];
```

FIG. 11D

```
int    iReadLength    =0;
int    iReadLengthSum =0;
while((iReadLength=
        (aURLConnectionInStream.read(aBuffer)))!=-1)
{
    aResponseOutStream.write(aBuffer,0,iReadLength);
    iReadLengthSum += iReadLength;
}
//unfortunately available() not possible, so I have to use a buffer and set filelength at last
aResponse.setContentLength(iReadLengthSum);
aResponseOutStream.flush();
return;
}
else
{

/*If no preferred MIME type, device type or XSL-stylesheet specified with the request exists, the associated default type is used.
*/
    // yes, so build path for xsl file which generates response
    if(((sPreferredMimeType==null)||(sPreferredMimeType.length()==0))
    {
        // no mime parameter set so get it via portal servlet
        sPreferredMimeType = aDataFacade.getPreferredMimeType(sSessionId);
    }
    if(((sDevice==null)||(sDevice.length()==0))
    {
        // no device parameter set so get it via portal servlet
        sDevice = aDataFacade.getDeviceName(sSessionId);
    }
    if(((sXSL==null)||(sXSL.length()==0))
    {

/*If channels are processed, the channel stylesheet is used, if articles are processed, the article stylesheet is used.
*/
        // no XSL parameter set so get via content
        String sSubMime=sResponseContent.substring(17);
        if(sSubMime.equals("Channels"))
        {
```

FIG. 11E

```
            sXSL = "Channels.xsl";
    else if(sSubMime.equals("Article"))
            sXSL = "Article.xsl";
    else
            throw new ServletException(
                    "+++ no correct xsl type!!!");
}
else
{
    /*If a XSL parameter is specified with the request, this stylesheet is used.*/
    //if no .xsl extension, add one
    if(sXSL.indexOf(".")==-1)
            sXSL = sXSL+".xsl";
}

/*The path to find the XSL stylesheet file is built. First, a device specific file is searched for in a subdirectory with the name of the device. If
this file is not available, the more generic device independent stylesheet is used.
*/
// build first chance path to xsl file
URL     aTempURL = new URL(aDataFacade.getXSLBase());
String  sXSLBase = aTempURL.getFile();
String  sSubMime = sPreferredMimeType.substring(
                    sPreferredMimeType.indexOf("/")+1);

File    aXSLMime = new File(sXSLBase, sSubMime);
File    aXSLDevice = new File(aXSLMime, sDevice);
File    aXSLFull = new File(aXSLDevice, sXSL);
if(!aXSLFull.exists())
{
    // first chance xsl file not there build second chance (no device specific transformation)
    aXSLFull = new File(aXSLMime, sXSL);
    if(!aXSLFull.exists())
            // no xsl found -> error
```

FIG. 11F

```
        throw new ServletException(
            "+++"+aXSLFull.getAbsolutePath()+
            "file not found!");
    }

//All the objects needed to parse XML-documents and for the XSL transformation are set up.
    // build parse environment
    ValidatingParser        aValParser = new ValidatingParser(true);
    XmlDocumentBuilderaValDocBuilder = new XmlDocumentBuilder();
    ValidatingParser        aParser = new ValidatingParser(false);
    XmlDocumentBuilderaDocBuilder = new XmlDocumentBuilder();
    XSLTransformEngineaTransformer = new XSLTransformEngine();
    XmlDocument             aSourceDoc = null;
    XmlDocument             aTransformerDoc = null;
    XmlDocument             aDrainDoc =
                            new XmlDocument();

// hook own entity resolver for finding dtds
    XMLResolver aXMLResolver = new XMLResolver(true);
    aXMLResolver.registerCatalogEntries("com.sun.star.portal.channel.dtd");
    // get/config parser and builder
    aValDocBuilder.setParser(aValParser);
    aValParser.setEntityResolver(aXMLResolver);
    aValDocBuilder.setDisableNamespaces(false);

aDocBuilder.setParser(aParser);
    aParser.setEntityResolver(aXMLResolver);
    aDocBuilder.setDisableNamespaces(false);

/*Parse the received response as an XML document and hold the whole document as a DOM tree in memory.
*/
    // parse received xml validating
    aDocInputSource = new InputSource(aProviderResponse);
    aDocInputSource.setSystemId(sDecodedURL);
    aValParser.parse(aDocInputSource);
    aSourceDoc = aValDocBuilder.getDocument();
    // parse xsl file NON validating
    aTempURL = aXSLFull.toURL();
    aXSLParameters.put("TransformURL", aTempURL.toString());
    aTransInputSource = new InputSource(aTempURL.toString());
//The XSL stylesheet is parsed and loaded into a memory.
```

FIG. 11G

```
aParser.parse(aTransInputSource);
aTransformerDoc = aDocBuilder.getDocument();
```
/*If the loaded document is a list of channels, this document is modified in a memory to which a user is not subscribed or of which the MIME
type is not accepted for the response. This is necessary, because such content could not be displayed on a user device.
*/
```
if(sResponseContent.equals("text/vnd.sun.xml.Channels"))
{
    Element    aRootElement = aSourceDoc.getDocumentElement();
    TreeWalker aRootWalker = new TreeWalker(aRootElement);
    Element    aChannelElement = null;
    // walk through channel elements
    while ((aChannelElement = aRootWalker.getNextElement("Channel")) != null)
    {
        // set subscribed attribute
        String sHref = aChannelElement.getAttribute("href");
        if (aDataFacade.isSubscribed(sSessionId, sHref))
        {
            aChannelElement.setAttribute("subscribed", "true");
        }
        else
        {
            aChannelElement.setAttribute("subscribed", "false");
        }
        TreeWalker aChannelWalker = new TreeWalker(aChannelElement);
        Element    aMimeElement = null;
        boolean    bMimeAccepted = false;
        // walk through mime-type elements of channel
        while(((aMimeElement = aChannelWalker.getNextElement(
                   "mime-type")) != null) && (!bMimeAccepted))
        {
            Node aNode = aMimeElement.getFirstChild();
            String sMimeType = new String(aNode.getNodeValue());
            bMimeAccepted = aDataFacade.isMimeTypeAccepted(sSessionId, sMimeType);
        }
        // set accepted attribute
        if(bMimeAccepted)
        {
            aChannelElement.setAttribute("accepted", "true");
        }
```

FIG. 11H

```
        else
        {
            aChannelElement.setAttribute("accepted", "false");
        }
    }
    /* If the loaded document is an article, it is checked, if this MIME type is accepted as a response.
    */
    else if(sResponseContent.equals("text/vnd.sun.xml.Article"))
    {
        Element     aRootElement = aSourceDoc.getDocumentElement();
        TreeWalker  aRootWalker  = new TreeWalker(aRootElement);
        Element     aItemElement = null;
        //walk through item elements
        while ((aItemElement = aRootWalker.getNextElement("Item")) != null)
        {
            TreeWalker aItemWalker = new TreeWalker(aItemElement);
            Element    aMimeElement = null;
            boolean    bMimeAccepted = false;
            //walk through mime-type elements of item
            while ((((aMimeElement = aItemWalker.getNextElement(
                                 "mime-type")) != null) && (!bMimeAccepted))
            {
                Node aNode = aMimeElement.getFirstChild();
                String sMimeType = new String(aNode.getNodeValue());
                bMimeAccepted = aDataFacade.isMimeTypeAccepted(sSessionId, sMimeType);
            }
            // set accepted attribute
            if(bMimeAccepted)
            {
                aItemElement.setAttribute("accepted", "true");
            }
            else
            {
                aItemElement.setAttribute("accepted", "false");
            }
        }
```

FIG. 11I

```
/*The global parameters for the XSL transformation are set and the loaded XML document is transformed according to the rules in the loaded
XSL stylesheet.
*/
    aTransformerDoc = aDataFacade.setParameters(aTransformerDoc, aRequest, aXSLParameters);
    // transform
    aTransformer.createTransform(aTransformerDoc)
              .transform(aSourceDoc,aDrainDoc);

/*The outputstream for the response is obtained and the transformed XML document is streamed, which now can be, for example, HTML or
WML to this stream. The webserver delivers this stream as the response of the original request to the client.
*/
    // write it
    OutputStream aOutStream = aResponse.getOutputStream();
    aResponse.setContentType(sPreferredMimeType);
    aDrainDoc.write(aOutStream);
    aOutStream.flush();

}
catch(...
```

FIG. 11J

COMPUTER-BASED PRESENTATION MANAGER AND METHOD FOR INDIVIDUAL USER-DEVICE DATA REPRESENTATION

BACKGROUND OF THE INVENTION

1. Field of the Invention

The present invention relates generally to data representations, and more particularly to a method for the individual representation of data on a variety of different computing systems.

2. Description of Related Art

Many types of user devices communicate over various communication networks. Information requested by a user device over a communication network naturally needs to be provided to the user device in a format understood by the specific user device. Therefore, in many instances information is only accessible to a certain group of user devices. For example, homepages of individuals or companies provided by a web server over the Internet are generally available only to specific user devices, namely computer systems supporting the regular homepage data format HTML (Hyper-Text Markup Language).

However, the access of other user devices to this information may also be desirable. Such user devices may be, for example, handheld computers or mobile telephones. Unfortunately, the Internet browsers that process and display the HTML homepages typically require over 50 Megabytes of storage, which is not available on handheld computers or mobile phones.

Alternative methods are available, for example, that permit mobile telephones to send and receive information from the Internet. Typically, a program executing on the telephone transmits a URL, or a representation of a URL to a server that translates the request, and retrieves the data over the Internet. The server then converts the retrieved content into a format that can be interpreted by the mobile telephone and transmits the data to the mobile telephone for display. See for example, U.S. Pat. No. 5,809,415 of Rossmann entitled "Method and Architecture for an Interactive Two-Way Data Communication Network."

Another similar approach is described in U.S. Pat. No. 5,727,159, entitled "System In Which a Proxy-Server Translates Information Received From the Internet Into a Form/Format Readily Usable by Low Power Portable Computers," of Kikinis issued on Mar. 10, 1998. In this approach, a specialized browser must be installed on each device that communicates with a proxy-server that in turn communicates with the Internet. A device that does not have the specialized browser, or cannot execute the specialized browser cannot retrieve or display content using the proxy-server.

Thus, the prior art teaches that it is necessary to develop an independent technique to provide access to particular information. For example, the prior art technique for mobile phones was not used on portable computers and conversely.

SUMMARY OF THE INVENTION

According to an embodiment of the present invention, a method and a system allow access to data, particularly over a network, to a variety of different user devices, including mobile phones and handheld computers. Unlike the prior art methods, this method and system are not limited to devices that have either a predefined configuration, or predefined software loaded on the device. Rather, the presentation requirements of a device are determined, and a document compatible with those presentation requirements is generated by a presentation manager server system.

Consequently, the problems associated with updating and providing specialized software to each type of user device have been eliminated. Also, it is no longer necessary to write specialized software for each type of user device that is provided data from a single content source, or for each content source that has a different data format.

In one embodiment, a method for presenting data on a user device includes: receiving, by a presentation manager, a request from the user device for data from any one of a plurality of different data sources, identifying presentation requirements of the user device to the presentation manager, and selecting a presentation scheme for the data in accordance with the presentation requirements of the user device, where the presentation scheme can be applied to the data to generate presentable data for the user device.

In one embodiment, this method also includes applying the presentation scheme to the data to create the presentable data. This operation is performed by the presentation manager, by the user device, or by any other device, which applies the presentation scheme and provides the presentable data to the user device. The aforementioned method may be supplemented by transmitting the presentable data to the user device to allow the presentation of the data on the user device.

In another embodiment of the present invention, a method also is provided for obtaining data by a user device having presentation requirements relating to the presentation of the data on the user device. This method includes submitting a request to obtain data by the user device to a presentation manager coupled to the user device. The request causes the identification of the presentation requirements of the user device to the presentation manager, and the selection of a presentation scheme for the data in accordance with the presentation requirements of the user device by the presentation manager. The request further causes the application of the selected presentation scheme to the data to create presentable data. This method further includes receiving in the user device the presentable data to allow the presentation of the data by the user device.

In one embodiment of the present device, the data requested is retrieved via at least one portlet coupled to the presentation manager. Herein, a portlet is understood to be means for providing the requested data from a data source, for example, from a certain homepage or database to the presentation manager.

Two or more portlets may be arranged in a tree-like organization. This tree-like organization is presented to a user of the user device, for example, on a display screen of the user device, so that this user has the possibility to easily choose among the content offered via the portlets.

In one embodiment, the presentation requirements of the user device are determined based on information about the user device. For example, if the presentation manager is informed about the type of the user device, the presentation manager can determine therefrom the presentation requirements of the user device and select a presentation scheme based thereon.

Presentation schemes may be defined, for example, in an extensible style sheet language (XSL). The presentation scheme may describe, for example, if a certain content defined in XML is displayed, where this content is displayed and how this content is displayed.

In another embodiment of the method of this invention, a request is received from a user device. The request was generated in response to a selection of a portlet identification object on the user device. The request is transferred to a portlet. The portlet retrieves data specified in the request over a network. This data has one format in a plurality of source data formats.

The request also is analyzed to determine a user data format that is supported by the user device. A presentation scheme to convert the data from the source data format to the user data format is then selected. The retrieved data is converted from the source data format to the user data format using the presentation scheme.

In one embodiment, selecting a presentation scheme includes selecting an XSL-stylesheet. The received request includes, in another embodiment, a command. The command is selected from a group of commands consisting of load, save, article, and channel.

In yet another embodiment of the present invention, a web server receives a request from a user device. The request was generated by selection of a portlet identification object on the user device. The web server analyzes the request to determine whether the request is for content associated with a portlet. The request is transferred to a presentation manager upon the web server determining that the request is for content associated with a portlet. The presentation manager passes the request to a portlet. The portlet retrieves data specified in the request over a network. The retrieved data has a source MIME type.

The presentation manager analyzes the command to identify a user MIME type, and then selects a presentation scheme from a plurality of presentation schemes based upon the user MIME type and the source MIME type. The presentation manager converts the data from the source MIME type to the user MIME type using the presentation scheme.

In a further embodiment of the present invention, a presentation manager server system includes a web server, a presentation manager coupled to the web server, and at least one portlet coupled to the presentation manager. The at least one portlet may comprise any one of a mail portlet, a resource description framework portlet, and an internal network information portlet. A portlet is associated with content that is retrieved by that portlet. The presentation manager server system also may include a storage medium having stored thereon a plurality of presentation schemes.

In another embodiment of the presentation manager server system, the web server includes a servlet container, and the presentation manager includes a servlet.

In yet another embodiment, a computer program product has stored thereon computer instructions for a method including:
   receiving a request from the user device for the data;
   identifying presentation requirements of the user device; and selecting a presentation scheme for the data in accordance with the presentation requirements wherein upon application of the presentation scheme to the data, new data presentable on the user device is generated.

In a further embodiment, a computer program product has stored thereon computer instructions for a method including: receiving a request from a user device generated by selection of a portlet identification object on the user device; transferring the request to a portlet wherein the portlet retrieves data specified in the request over a network and further wherein the data has one format in a plurality of source data formats; analyzing the request to determine a user data format that is supported by the user device; selecting a presentation scheme to convert the data from the source data format to the user data format; and converting the data from the source data format to the user data format using the presentation scheme.

In yet another embodiment, a computer program product has stored thereon computer instructions for a method including: receiving a request from a user device generated by selection of a portlet identification object on the user device by a web server; analyzing the request by the web server to determine whether the request is for content associated with a portlet; transferring the request to a presentation manager upon determining that the request is for the content associated with a portlet; passing the request to the portlet by the presentation manager wherein the portlet retrieves data specified in the request over a network and further wherein the data has a source MIME type; analyzing the request to identify a user MIME type; selecting a presentation scheme from a plurality of presentation schemes based upon the user MIME type and the source MIME type; and converting the data from the source MIME type to the user MIME type using the presentation scheme.

BRIEF DESCRIPTION OF THE DRAWINGS

FIG. 6 is an example of a class PortletManager that is used to instantiate the portlet manager object according to one embodiment of the present invention.

FIGS. 7A and 7B are an example of method do Post and do Get according to one embodiment of the present invention.

FIGS. 8A and 8B are an example of a class CommandFactory that includes method producecommand according to one embodiment of the present invention.

FIGS. 9A to 9E are an example of a class LoadCommand according to one embodiment of the present invention.

FIGS. 10A and 10B are an example of a class SaveCommand according to one embodiment of the present invention.

FIGS. 11A to 11J are one embodiment of class ChannelCommand according to one embodiment of the present invention.

In the figures and detailed description, elements with the same reference number are the same element or a similar element.

DETAILED DESCRIPTION

Figure 1A:
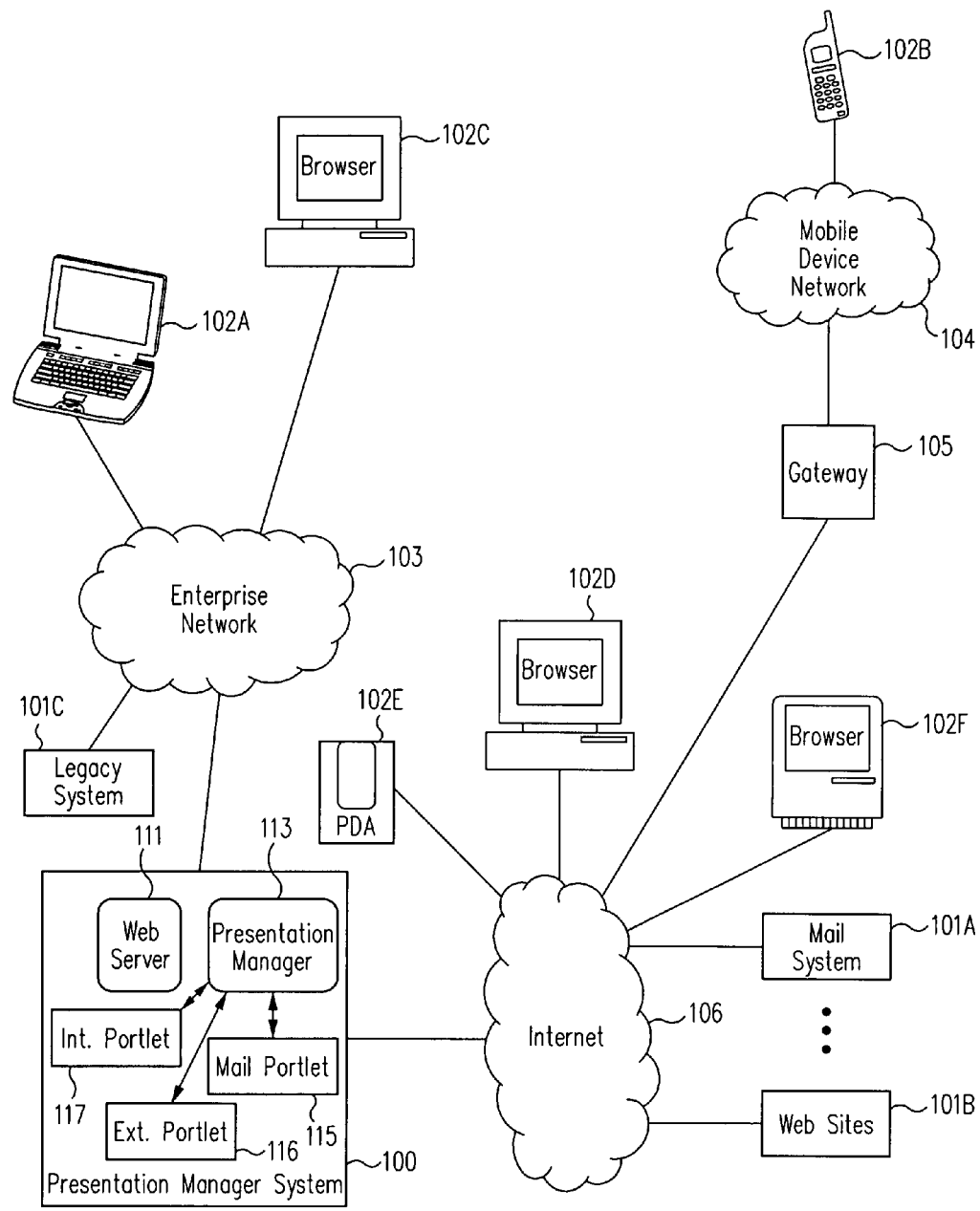
FIG. 1A illustrates one embodiment of a network including a plurality of user devices coupled to a presentation manager server system according to one embodiment of the present invention.

According to the principles of this invention, a single presentation manager 113, executing on a presentation manager server system 100, accesses information from any one of a plurality of content sources 101A to 101C in response to a request from any one of a plurality of user devices 102A to 102F. Each of the plurality of user devices 102A to 102F may have different requirements for presentation of information retrieved by presentation manager 113, i.e., different presentation requirements. When a request for information is received from a particular user device, presentation manager 113 retrieves the information, identifies the presentation requirements of the particular user device, and then transforms the information, if necessary, using a presentation scheme specific to the user device so that the information can be presented on the particular user device.

The presentation requirements may be any conditions or limitations on the presentation of data on the user device, for example, kind and size of display on the user device, type of programming language or data format supported by the user device, or any other presentation requirements of the user device, for example, of the processor or the memory. These presentation requirements not only may result from technical necessities, but also may result from an individual user's demands or wishes. The user is not constrained to accessing data in a format that is compatible with the one particular device that the user happens to be using as in the prior art.

Hence, presentation manager server system 100 solves the prior art information access limitations by giving users access from whatever device is available at the time, through a single system entry point, to a complete complement of data. As explained more completely below, presentation manager server system 100 frees a user from time and location constraints when accessing the complete complement of data.

A user can access data on Internet 106 and/or enterprise network 103 from almost any available device, e.g., any one of a portable computer 102A, a mobile telephone 102B, a workstation 102C, a home personal computer (PC) 102D, a personal digital assistant 102E, or an Internet cafe machine 102F. No longer is a user limited to using a particular device with pre-installed software to access a particular type of data accessible via a network to which the device is coupled.

For example, a user taps an icon displayed on PDA 102E to generate a request for a sales report that is stored in a database on legacy system 101C. The request is sent over Internet 106 to presentation manager 113 that, in turn, retrieves the sales report via an internal portlet 117, transforms the sales report according to a presentation scheme for PDA 102E, and transmits the transformed sales report to be displayed on PDA 102E. A similar transaction could be done using Internet cafe machine 102F, or perhaps mobile telephone 102D.

Each user device in the plurality of user devices 102A to 102F accesses information through the same portlet. However, in a first embodiment, presentation manager 113 retrieves the information using the portlet and then transforms the information using a presentation scheme that is specific to the user device so that the retrieved information can be displayed by the user device. Alternatively, presentation manager 113 could provide the presentation scheme and the retrieved data to the user device and the transformation of the retrieved data could be done on the user device itself.

Plurality of devices 102A to 102F is illustrative only and is not intended to limit the invention to the particular devices illustrated. The devices could also include, for example, a POTS telephone, a pager, a settop box connected to a television, a network appliance, or any other device that is connectable to a network and can issue a request for data, as described more completely below, and display the data received in response to the request. This embodiment of the present invention is not limited to a particular type of user device or to a particular group of user devices as in the prior art, or to user devices that are running a particular software program.

The user can access multiple content sources via presentation manager server system 100. Different types and formats of data from different applications can all be accessed and processed within a single user interface. Further, data from external sources, such as stock quotes, weather forecasts, or perhaps news tickers from web-based service providers can be accessed using the same single user interface. According to the principles of this invention, presentation manager server system 100 is a comprehensive client/server offering that enables users, from almost any device anywhere, to access and view different types of data from a wide variety of content sources.

As an example, consider user device 102A (FIGS. 1A and 1B) that is a portable computer. The display on display screen 150 includes, within a work area, three portlet icons, e.g., an internal page icon 120, an external page icon 121, and a news ticker icon 122. In this example, the use of icons to represent portlets is illustrative only and is not intended to limit the invention to this specific embodiment. For example, a list of text names could also be used. In general, a portlet identifier is provided to a user, and upon selection of the portlet identifier by the user, a request is sent to presentation management server system 100 to retrieve and return content associated with the portlet identifier.

Figure 1B:
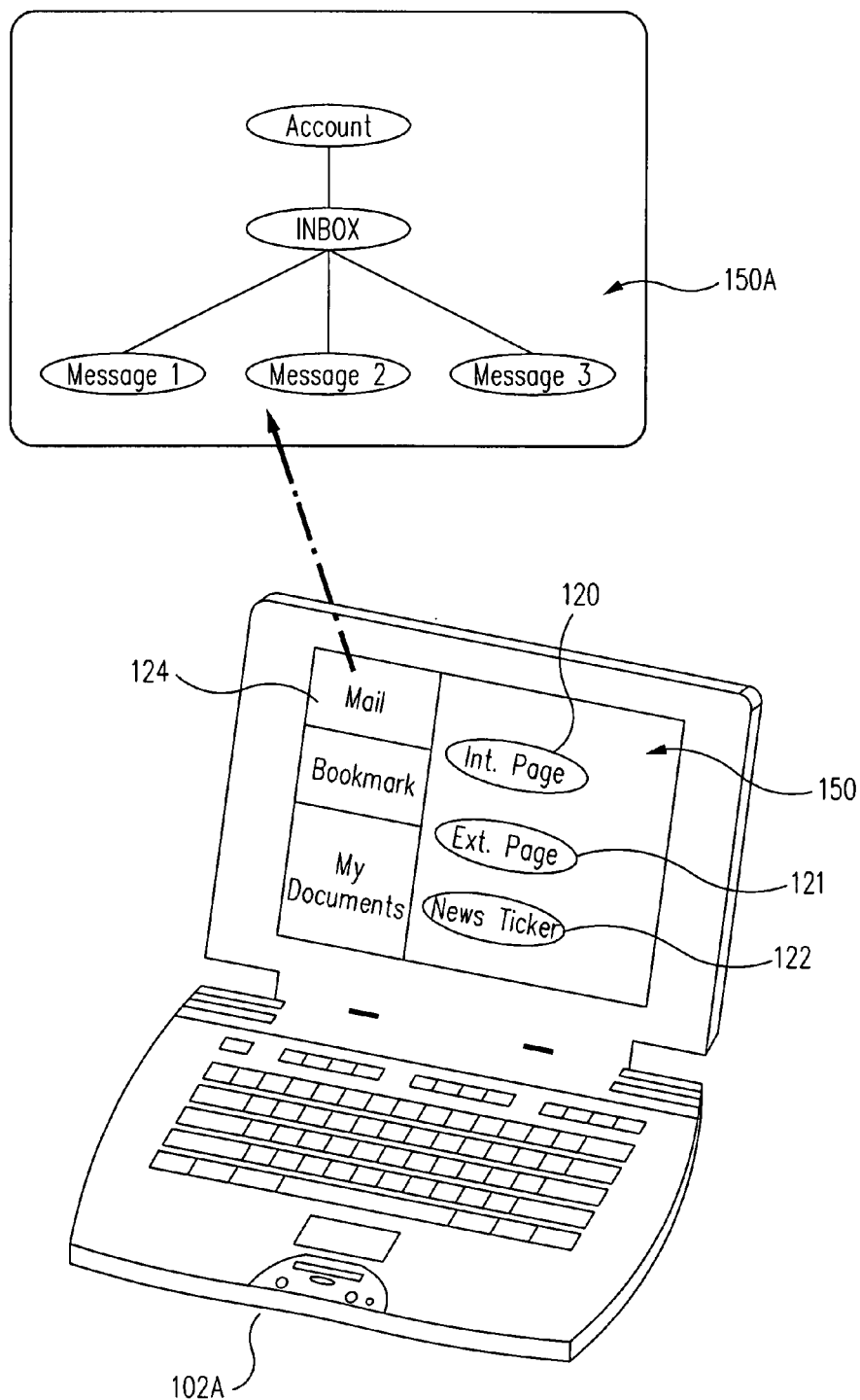
FIG. 1B is a more detailed illustration of one embodiment of user device 102A of FIG. 1A including portlet icons according to one embodiment of the present invention.

In an explorer region on display screen 150 is a mail icon 124. If the user selects mail icon 124, a hierarchical view is generated on display screen 150A as illustrated in FIG. 1B, each entry of which represents a portlet that can be used, in one embodiment, to request information from presentation manager server system 100. Corresponding to each icon displayed on user device 102A is a portlet, e.g., portlets 115 to 117 that are coupled to presentation manager 113, as explained more completely below.

Alternatively, icons 120 to 122 on display screen 150 could each expand into a hierarchy of icons. Moreover, upon selection of an icon, typically by the user placing a cursor on the icon and clicking a mouse, the user could be presented, for example, with an input screen in which the user input commands for acting on data. When the user completes the input screen, a request that includes the commands for acting on data is dispatched to presentation manager server system 100.

Thus, according to the principles of this invention, a portlet icon, or more generally, a portlet identifier, is not limited to issuing only a request to retrieve information. The user-initiated request can also include commands that perform operations on data, for example. However, in each case, a portlet icon is associated with a specific source of information, sometimes called content, as explained more completely below.

Instead of the screen portlet icons in FIG. 1B, the portlets may also be offered to the user in the form of a text based listing on the display of the user device. This listing may be put together in presentation manager 113, for example, in the extensible Markup Language (XML) format. In addition, the user can obtain a list of information sources available through presentation manager server system 100 by issuing a request to presentation manager 113 that is not addressed to a specific portlet. With this list, the user can select portlets of interest to the user, as explained more completely below with respect to FIG. 2B.

Thus, an individual user can personalize the user device by specifying which service providers from among the ones the organization has made available via portlets, the user wants to use. To put it another way, the user chooses which portlets the user wishes to be included on the desktop as illustrated in FIG. 1B. (A portlet is the smallest unit of information that can be put in a portal.) Hence, presentation manager server system 100 eliminates prior art limitations on a single user system on a network accessing content on any desired provider system that is coupled to the network.

When a user selects one of the icons on display screen 150, user device 102A, which is coupled to a network server 111 by an enterprise network 103, issues a request associated with the selected icon. The request specifies (i) a suitable address to the location where the content associated with the request is stored, for example, the Internet address of a homepage in the form of a uniform resource locator (URL), and (ii) information concerning either the types of data that can be processed and displayed by user device 102A, e.g., MIME types, and/or, an identifier that indicates the processing and display capabilities of user device 102A. In addition, the request can include operations that are to be performed on the data, or using the data, e.g., find all web sites including the word or words specified in the request.

Enterprise network 103 is illustrative only of one embodiment of a network. The particular type of network connecting a user device to presentation manager server system 100 is not essential, and may be the Internet or any other permanent or temporary network, for example a local area network.

Upon receipt of the request, network server 111 in presentation manager server system loo, which in one embodiment is a web server, determines that the request is for data accessed via presentation manager 113 and transfers the request to presentation manager 113.

Upon receipt of the request from network server 111, presentation manager 113, as explained more completely below, passes the request to the portlet associated with the request. For example, if the user issued a request for all new mail messages, presentation manager 113 would pass the request to mail portlet 115 that is associated with mail system 101A. If the request was for information on an external network, presentation manager 113 passes the request to external portlet 116 that may be associated, for example, with one of web sites 101B. In one embodiment, portlet 116 accesses web sites 101B that provide content using the Resource Description Framework (RDF).

The portlet that receives the request from presentation manager 113 retrieves the requested data and returns the data to presentation manager 113. Typically, each of the plurality of portlets 115 to 117 accesses data, i.e., content, in a different format. Of course, one or more portlets could be configured to retrieve data having the same format. For example, text based information may be provided in the HTML format as well as in the WML format.

In addition to passing the request to the appropriate portlet, presentation manager 113 identifies the presentation requirements of the user device for the requested data. Using the identification of the presentation requirements, presentation manager 113 selects a presentation scheme for the requesting user device.

As used herein, the presentation scheme for a user device is the totality of the configuration information needed to extract data from a first format and transform the data into new data for presentation on that user device. In one embodiment, as explained more completely below, the presentation schemes include a plurality of eXtensible Style sheet Language (XSL)-stylesheets that are stored on a storage medium for access by presentation manager 113. Each XSL-stylesheet transforms eXtensible Markup Language (XML) data to new data that can be processed and displayed by a particular user device, sometimes referred to as user device presentable data.

In selecting a presentation scheme, in one embodiment, presentation manager 113 determines whether the request from the user device includes a specific identification of a presentation scheme; a list of MIME types that the user device is capable of displaying; and either a user identification and/or a device identification. If the user request specifies a specific presentation scheme, for example, a particular XSL-stylesheet, presentation manager 113 selects that stylesheet as the presentation scheme. If a MIME type is specified in the request and presentation manger 113 has an XSL-stylesheet for transforming the requested content to that MIME type, this XSL-style sheet is selected. If the requested content is in a MIME type that is in the list of MIME types in the request, presentation manager 113 simply passes the retrieved content straight thru. If presentation manager 113 cannot identify a specific presentation scheme for the requested data, presentation manager 113 simply passes the retrieved content straight thru, in one embodiment. Thus, in each instance, presentation manager 113 identifies the presentation requirements based upon information specified in the request, and selects an appropriate presentation scheme.

The presentation scheme selected by presentation manager 113 is retrieved and loaded into a local memory. When the requested data is available in a memory addressable by presentation manager 113, presentation manager 113 uses the stored presentation scheme to process the stored data and thereby generate user device presentable data, which may be presented in accordance with the requirements of user device 102A that transmitted the original request. Finally, the user device presentable data is transferred to user device 102A over the network coupling user device 102A to presentation manager server system 100.

Hence, through use of a dynamic content channel, e.g., a portlet, a highly customizable content page may be produced for any individual client system. Moreover, a particular user device is not limited to accessing content in a format identical to that associated with the user interface in use on the user device. Consequently, the user's ability to access a wide variety of content sources independent of the characteristics of the particular user device is further enhanced with the portlets in this embodiment of the invention.

As used herein, a user device and/or a computer system includes at least a processor, a storage medium, and an I/O-interface. In the context of the present invention, data refers to any type of information, which is arranged in certain order to be accessible by a computer system. The data to be accessed may also include one or more functions or functionalities provided to the user of a user device. Functions are, in this context, possibilities given to the user to initiate actions beyond the mere retrieval or display of information, for example, a search on the Internet for a certain publication or the initialization of a software program on a remote server carrying out some operations in response to the user device's request.

Figure 2A:
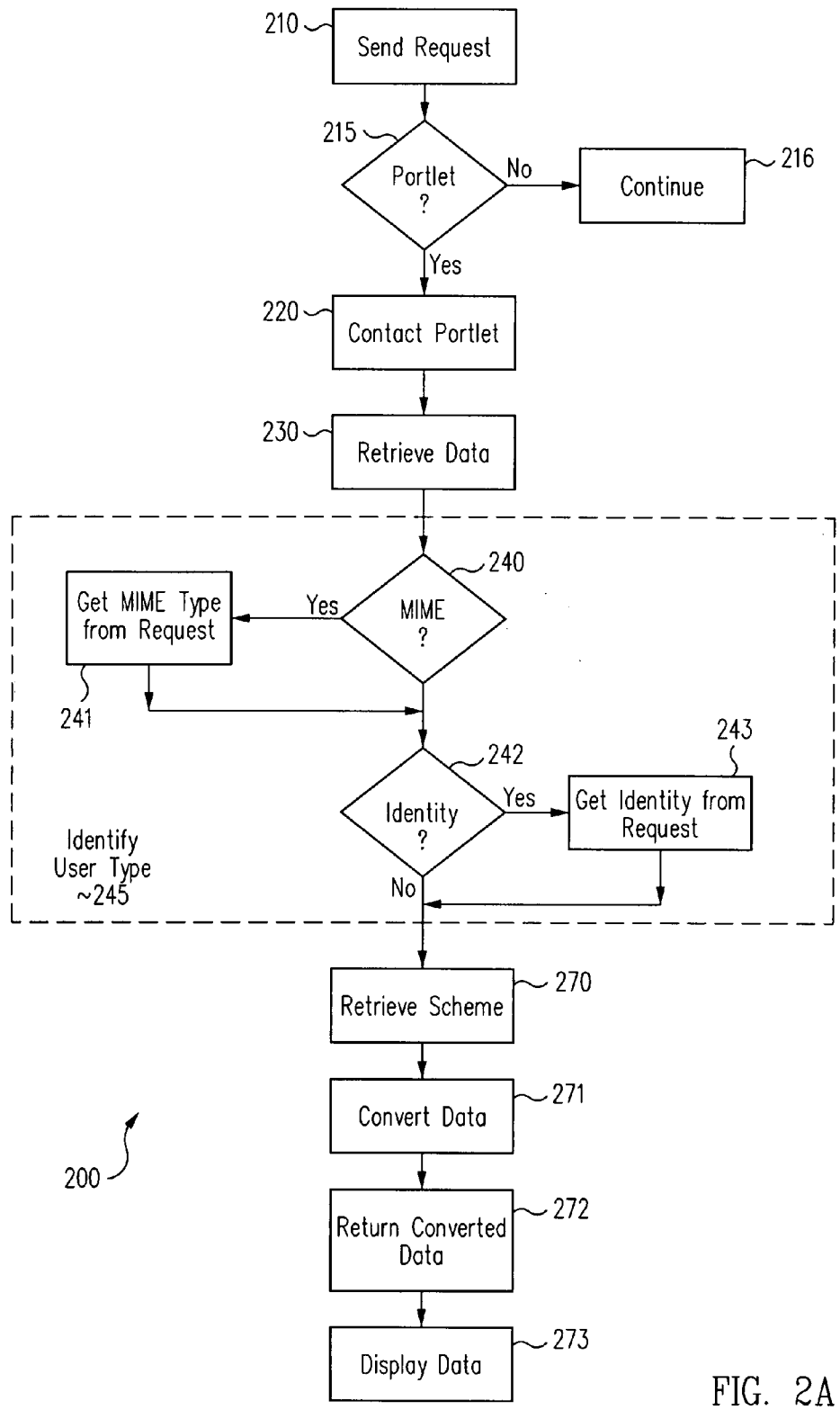
FIG. 2A is a process flow diagram according to one embodiment of the present invention.
Figure 3:
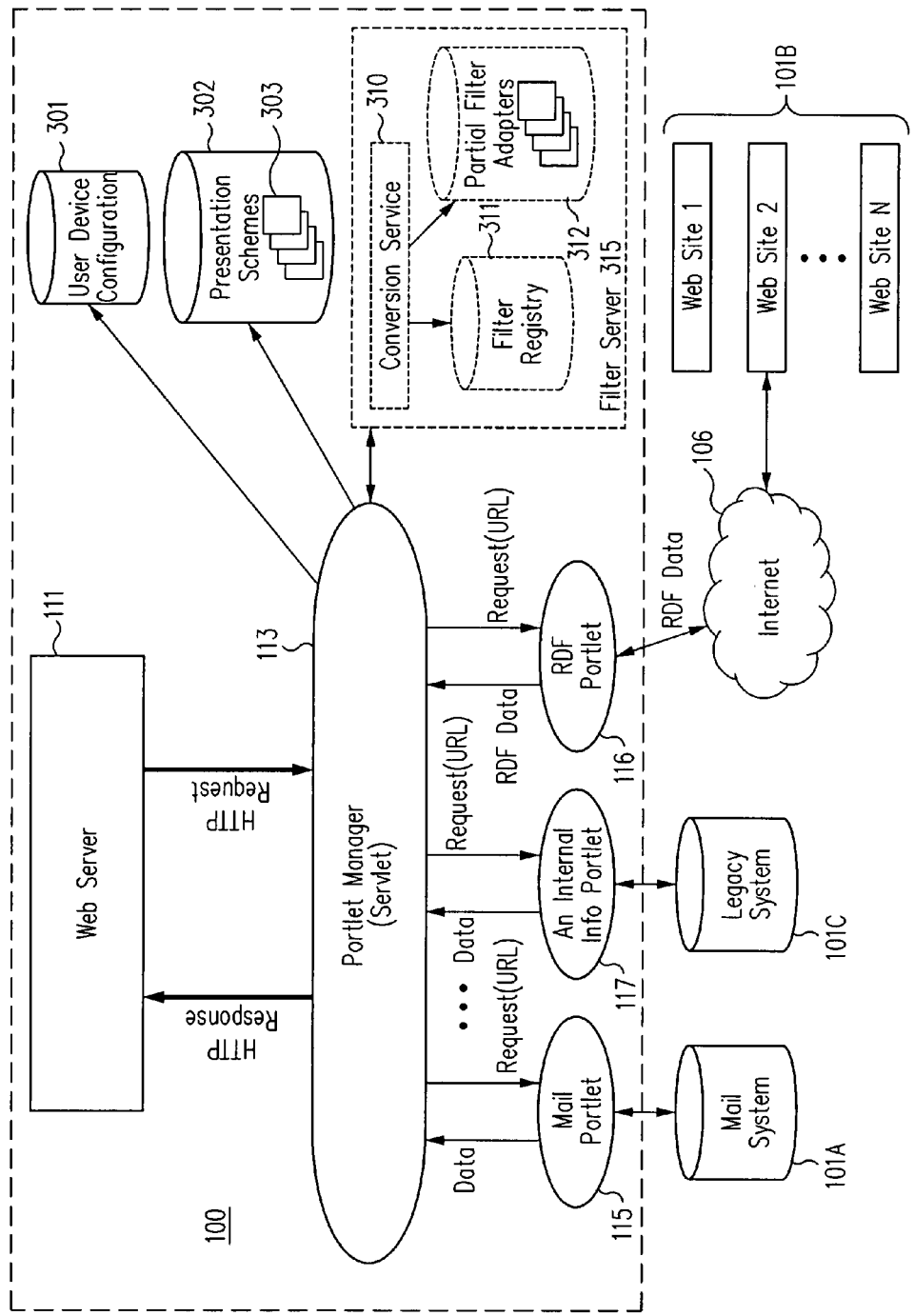
FIG. 3 is a more detailed illustration of the presentation management server system according to one embodiment of the present invention.

FIG. 2A is a process flow diagram of one embodiment of a method 200 according to the present invention. FIG. 3 is a more detailed block-level diagram of one embodiment of presentation manager server system 100 that implements method 200 of FIG. 2A. In this embodiment, network server 111 is a web server 111, and presentation manager 113 is a portlet manager 113.

As explained above, a user initiates a request on a user device by selecting a portlet identifier, e.g., an icon, for example, that represents a particular instance of data that is accessible via a particular portlet in presentation manager server system 100. In this embodiment, an icon representing a portlet is only selectable for display on display screen 150 (FIG. 1B) if the data provided by the portlet may be presented by the user device. For example, if the user device does not support graphics, a portlet, which provides data with the MIME type image/jpeg, would not be available for selection for display on display screen 150 of device 102A.

Figure 2B:
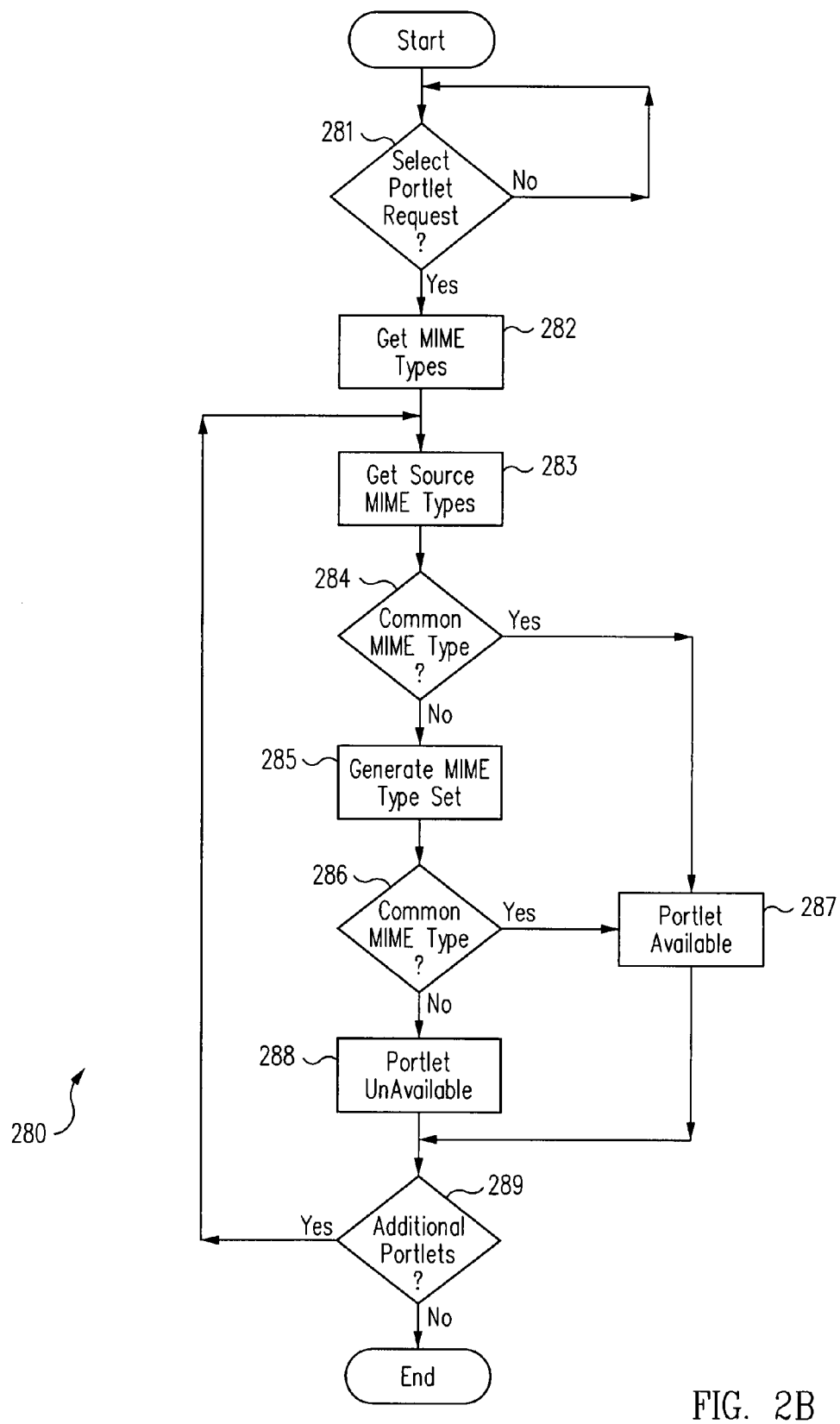
FIG. 2B is a process flow diagram for selecting portlets that can be accessed by a user device according to one embodiment of the present invention.

In one embodiment, this pre-selection of portlets offered to the user is made by a comparison of the MIME types supported by the user device and the MIME type of data for each of the portlets. FIG. 2B is a process flow diagram of a method 280 that is used in one embodiment of the present invention to preselect portlets that are made available to a particular user device. Method 280 is not started unless a user issues a request to select one or more portlets for a particular device. This is represented by preselect portlet for access request check operation 281 that typically is part of a graphic user interface event handler, or part of a windowing system event handler.

Upon the user issuing a request to preselect one or more portlets, check operation 281 designates the portlet selected, or one of the portlets selected, as the current portlet and transfers processing to get user MIME types operation 282. In operation 282, presentation manager server system 100, in this embodiment, obtains the MIME types supported by the user device, i.e., obtains the user MIME types, and transfers to get source MIME types operation 283.

In operation 283, the source MIME types supported by the current portlet are retrieved and processing transfers to common MIME type check operation 284. If at least one of the user MIME types and one of the source MIME types are the same MIME type, processing transfers to portlet available operation 287, and otherwise to generate MIME type set operation 285.

In generate MIME type set operation 285, presentation schemes 303 are used to generate another set of MIME types, which are the MIME types produced when presentations schemes 303 are applied to the source MIME types. Operation 285 transfers processing to common MIME type check operation 286.

If at least one of the user MIME types and one of the MIME types in the set of MIME types generated by operation 285 are the same MIME type, processing transfers to portlet available operation 287, and otherwise to portlet unavailable operation 288.

In portlet available operation 287, the current portlet is flagged as available to the user device and an appropriate response is supplied to the user device. For example, the portlet icon could be installed on the user's desktop.

In portlet unavailable operation 288, the current portlet is flagged as unavailable. In this case, a message is sent to the user that access to the portlet is not available from this user device.

Both operations 287 and 288 transfer to additional portlets check operation 289. If the user requested to preselect more the one portlet, the next portlet in the user request is identified as the current portlet, and operations 283 to 288 are repeated, as appropriate. If the user only requested to preselect one portlet, or all of the portlets have been processed, check operation 289 passes to the end operation that cleans up and exits.

In the above example relating to graphics, the presentation capabilities of the user device did not support graphics. The comparison with the MIME type of data defined by the various portlets shows that a portlet defining image/jpeg as its MIME type of data cannot be supported by this user device. Accordingly, the user device via method 280 would be denied access to this particular portlet.

Method 280 may be made at any suitable location, for example, in the user device as well as in web server 111, in portlet manager 113, or in the respective portlet itself. Consequently, in the following description, when user device submits a request in operation 210, no subsequent checking is done to assure that the requested data can be displayed on the user device. However, in another embodiment, the user is allowed to send requests to all available portlets, and as each request is sent, if the request cannot be processed for whatever reason, an error message is returned to the user device.

The request transmitted in send request operation 210 (FIG. 2A) includes at least a description of the requested data. Such a description may be, for example, the URL of the data. The request typically also includes the MIME type or types supported by the user device, e.g., wireless application protocol (WAP) for mobile phone 102B. The request may also include either or both of the identity of the user device and the identity of the user of the user device. As explained more completely below, the request may further include a command, such as channel, load, save, or article.

The request from the user device in operation 210 goes over a network to web server 111, which in this embodiment is a web server 111. In one embodiment, web server 111 is the Tomcat server supplied by The Apache Software Foundation, 1901 Munsey Drive, Forest Hill, Md. 21050-2747, U.S.A. However, in this embodiment, any HTTP server that supports the functionality and operations described herein can be used as web server 111. In one embodiment, web server 111 is a servlet container, and portlet manager 113 is implemented as a servlet.

In portlet check operation 215, web server 111 analyzes the request from the user device, sometimes referred to as the original request, to determine whether this request has to be processed by portlet manager 113. The alternative is to process the request directly by web server 111.

Check operation 215 can be implemented in various alternative ways. In one embodiment, deployment descriptors as defined in the JAVA 2 Enterprise Edition are used and checked in operation 215 to determine where to direct the user request. The JAVA 2 Platform Enterprise Edition Specification, v1.2, Sun Microsystems, Inc., Palo Alto, Calif. (1999) and the JAVA Servlet Specification, v2.2, Sun Microsystems, Inc. Palo Alto, Calif. (1999) are incorporated herein by reference to show the level of skill in the art. Based upon the deployment descriptors, if the request is for web server 111, processing transfers to continue operation 216 and conventional processing continues. Otherwise, the request is forwarded to portlet manager 113 and processing transfers to contact portlet operation 220.

In another embodiment, the decision in check operation 215 is based on the MIME type of the requested data, i.e., the MIME type of the data located at the URL in the request, and the MIME type supported by the user device. If the MIME type of the requested data and the MIME type supported by the user device are identical or at least compatible, the request is processed by web server 111. This condition is frequently fulfilled, for example, if a browser, which is able to handle and to process data in XML, requests a homepage, which is also formatted in XML.

Thus, if the request is supported by web server 111, processing transfers to continue operation 216 and conventional processing continues. Otherwise, the request is forwarded to portlet manager 113 and processing transfers to contact portlet operation 220.

Portlet manager 113 may be implemented in software within web server 111, or may be installed on a separate computer system, which is connected or connectable to web server 111. In one embodiment, portlet manager 113 is implemented as a servlet that executes on web server 111.

Typically, portlet manager 113 is not continually executing on web server 111, and so if a request is forwarded to portlet manager 113 in contact portlet operation 220, portlet manager 113 is started and then the request is forwarded to portlet manager 113 for processing.

Portlet manager 113 forwards the request to the appropriate portlet. The forwarding of the request to a specific portlet completes contact portlet operation 220. The portlet retrieves the data in retrieve data operation 230, and processing in portlet manager 113 transfers to MIME check operation 240 within identify user type operation 245. In FIG. 2A, the operations are shown as sequential for ease of illustration only. This is not intended to limit the invention to this specific sequence of operations. The specific sequence will depend upon the computer system used and the specific implementation of this embodiment.

The request from the user device contains information about the presentation requirements of the requesting user device, or contains information about the identity of the user device, or contains both. If the request contains one or more MIME types processing transfers to a get MIME type from request operation 241 and otherwise to an identity check operation 242.

In get MIME type from request operation 241, portlet manager 113 extracts a list of MIME types supported by the user device from the request including a preferred MIME type, if a preferred MIME type is specified. Operation 241 transfers to identity check operation 242.

In identity check operation 242, portlet manager 113 determines whether the request included identification information. If the request included identification information, processing transfers to get identity from request operation 243 and otherwise, processing transfers to retrieve scheme operation 270. Get identity from request operation 243 retrieves the device identification from the request and transfers to retrieve scheme operation 270.

Operations 242 and 243 both transfer to retrieve scheme operation 270. In retrieve scheme operation 270, portlet manager 113 uses the information extracted from the request to retrieve a presentation scheme for the user device from a plurality of presentation schemes 303 stored on storage unit 302. In one embodiment, the retrieved presentation scheme is loaded in a memory accessible by portlet manager 113. Retrieve scheme operation 270 transfers processing to convert data operation 271.

Figure 4:
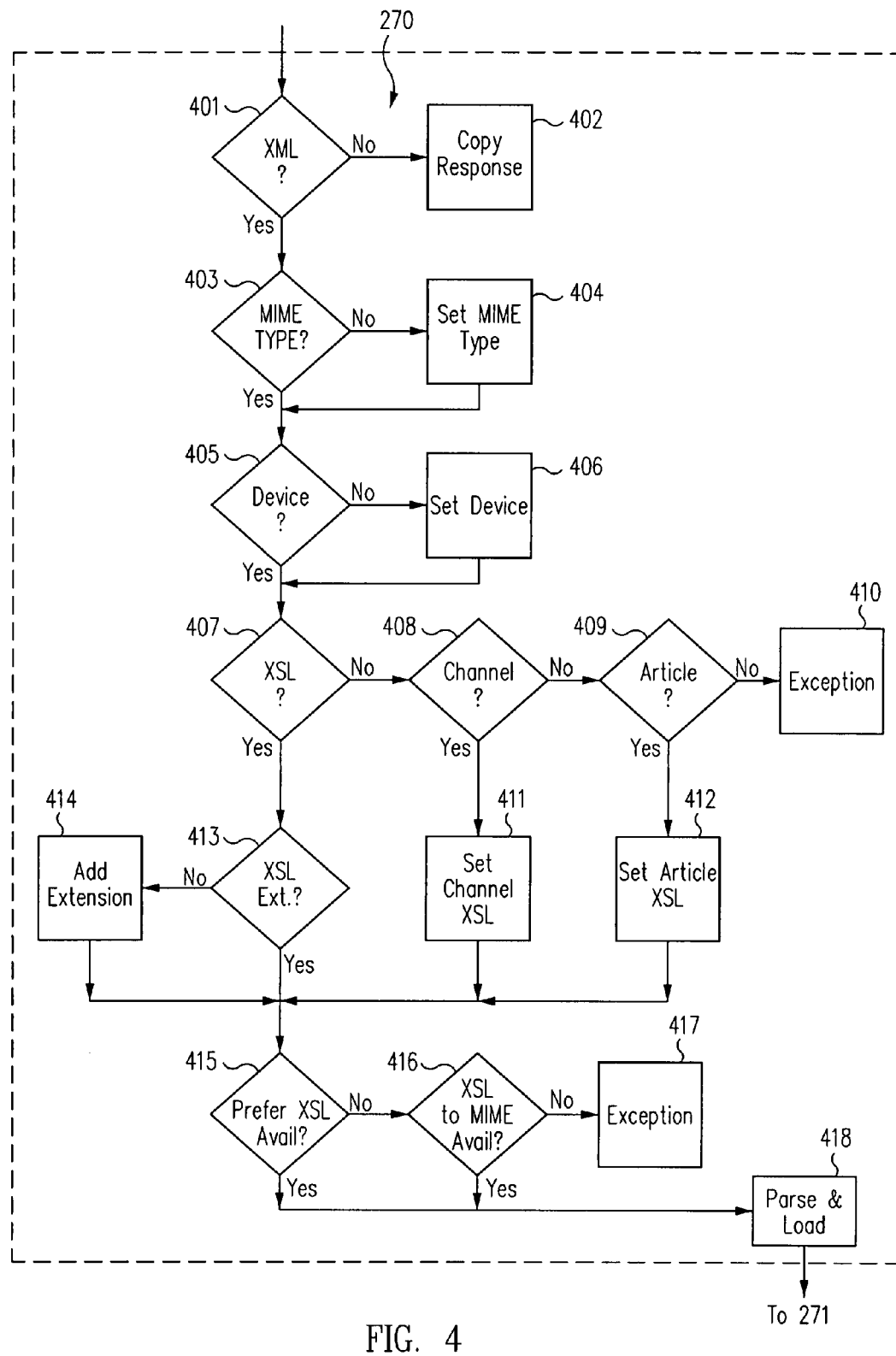
FIG. 4 is a more detailed process flow diagram of the retrieve scheme operation of FIG. 2A.

FIG. 4 is a more detailed process flow diagram of one embodiment of retrieve scheme operation 270. XML check operation 401 determines if the response content type is other than an XML format supported by portlet manager 113. If the response content type is other than an XML format, processing transfers to copy response operation 402 and otherwise to MIME type check operation 403. Check operation 401 and copy response operation 402 are optional.

In this embodiment, only transformations that utilize an XSL-stylesheet are supported, and so if the response content is not in a supported XML format, the response content cannot be transformed. Accordingly, copy response operation 402 copies the response information directly to web server 111 that can in turn send the copied response back to the user device for display. Of course if other transformations were supported, e.g., a JAVA class that extracted data from certain MIME types and inserted the data into an HTML template that could be returned to the user device, the applicability of each of the other transformations would be tested before defaulting of copy response operation 402.

If XML check operation 401 determines that the response content type is a supported XML format, a path to the appropriate XSL-style sheet in a plurality of XSL-style sheets 303 stored on storage unit 302 is constructed. MIME type check operation 403 determines whether the request from the user device included a preferred MIME type. If a preferred MIME type was obtained in operation 241, processing transfers to device check operation 405, and otherwise to set MIME type operation 404. Set MIME type operation 404 uses the session identification to retrieve a preferred MIME type from user device configuration information stored on storage unit 301. Operation 404 transfers to device check operation 405. Thus, upon entry to operation 405 a MIME type is specified.

Device type check operation 405 determines whether the request from the user device included a device type. If a device type was obtained in operation 243, processing transfers to XSL check operation 407, and otherwise to set device type operation 406. Set device type operation 406 uses the session identification to retrieve a device type from user device configuration information stored on storage unit 301. Operation 406 transfers to XSL check operation 407. Thus, upon entry to operation 407, a MIME type and a device type are specified.

XSL check operation 407 determines whether the request from the user device specified a specific XSL-stylesheet. If a specific XSL-stylesheet was specified, processing transfers to XSL extension check operation 413 and otherwise to channel command check operation 408.

In this embodiment, two commands, channel and article, result in retrieving data. Accordingly, channel command check operation 408 determines whether the command in the request was a channel command, and if it was, transfers to set channel XSL operation 411, and otherwise transfers to article command check operation 409. Set channel XSL operation 411 sets the XSL-stylesheet to a default channel XSL-stylesheet and transfers to preferred XSL-stylesheet available check operation 415.

When processing transfers to article command check operation 409, article command check operation 409 determines whether the command in the request was an article command, and if it was, transfers to set article XSL operation 412, and otherwise transfers to exception operation 410. Set article XSL operation 412 sets the XSL-stylesheet to a default article XSL-stylesheet and transfers to preferred XSL-stylesheet available check operation 415.

In this embodiment, exception operation 410 throws an exception and terminates the processing of portlet manager 113 for this portlet, because the requested information cannot be transformed for display on the user device. However, in another embodiment, portlet manager 113 may go to the website of a manufacturer of the user device, as identified in the request, or to another appropriate website to download an XSL-stylesheet for the user device. Alternatively, portlet manager 113 may send a query to the user device asking whether the user device has such a stylesheet that can be downloaded.

If the request specifies an XSL-stylesheet, check operation 401 transfers to XSL extension check operation 413, which in turn determines whether the specification in the request includes an XSL extension (.xsl). If the request included the extension, processing transfers to preferred XSL-stylesheet available check operation 415 and otherwise to set extension operation 414. Set extension operation 414 adds a XSL extension to the requested stylesheet and transfers to preferred XSL-stylesheet available check operation 415. Upon entry to operation 415, a MIME type, a device type and a XSL-stylesheet are specified so that the path to the storage location of the stylesheet can be constructed.

Preferred XSL-stylesheet available check operation 415 opens a folder on storage device 302 for the specified MIME type and then within the specified MIME type folder opens a subfolder for the specified device type. In the specified device type subfolder, operation 415 looks for the specified XSL-stylesheet. If the specified XSL-stylesheet is found, operation 415 transfers to parse and load operation 418, and otherwise transfers to XSL to MIME XSL-stylesheet available check operation 416. Thus, if operation 415 is successful, a device specific XSL-stylesheet has been retrieved.

In MIME XSL-stylesheet available check operation 416, the specified XSL-stylesheet is looked for in the specified MIME type folder, and if the stylesheet is found, processing transfers to parse and load operation 418 and otherwise to exception operation 417. Exception operation 417 also terminates the processing because the XSL-stylesheet is unavailable. Again, in another embodiment, attempts to find a suitable XSL-stylesheet stored at another location could be made prior to throwing the exception. Load and parse operation 418 loads and parses the retrieved stylesheet into a memory for further use by portlet manager 113 and transfers to operation 271 (FIG. 2A).

When the portlet completes the retrieval of the requested data in retrieve data operation 230, convert data operation 271 is initiated. Portlet manager 113 processes the retrieved data using the stored presentation scheme to generate new data that can be displayed on the user device. For example, if the retrieved information is a XML document, the XSL-stylesheet loaded in memory is used to do the transformation. If the retrieved information is e-mail data, a JAVA class is used to extract the data and insert the data for example into a HTML template.

Convert data operation 271 transfers to return converted data operation 272. In operation 272, portlet manager 113 returns the converted data in a HTTP response to web server 111. Web server 111 sends the HTTP response to the user device that sent the original request.

In display data operation 273, the user device processes the HTTP response, and displays the response to the original request on the user device.

In this example, it was assumed that convert data operation 271 was performed on the same computer running portlet manager 113. However, in another embodiment, retrieve scheme operation 270 and retrieve data operation 230 send the retrieved scheme and retrieved data respectively to another computer system connected to the user device, or the user device itself. In these cases, convert data operation 271 is performed on the another computer system, or the user device, and return converted data operation 272 is performed only if operation 271 was executed on other than the user device.

In the above embodiment, it was assumed that portlet manager 113 was able to identify the type of presentation requirements for the requesting user device and retrieve a presentation scheme that converted the type of the requested data to a type that could be displayed on the user device. In another embodiment, a presentation scheme is not available to convert the retrieved data to a type of data that can be displayed on the user device. For example, the user requests a spreadsheet that has a data format specified by the manufacturer of the application that generated the spreadsheet. The presentation scheme available for the user device requires an input document in XML. Since the retrieved document in not in XML, the presentation scheme is not useful.

However, in this situation, portlet manager 113 issues a translation request to a filter server 315. In one embodiment, portlet manager 113 sends a request that includes the MIME type required as input to the presentation scheme for the user device, and an address of the requested document to filter server 315. This address can be to a memory where the document is stored after being retrieved by a portlet, or a URL to a location of the document on the network. The only requirement is that filter server 315 is able to access the requested document.

In response to the request, filter server 315 builds a filter that can read the requested document, dynamically convert the read data using a partial filter adapter chain to the new format, and then write the converted data in the new format so that the data can be supplied to portlet manager 113. More specifically, in response to the request from portlet manager 113, filter server 315 via a conversion service 310, in one embodiment, causes a protocol reader to be instantiated and uses the protocol reader to access the requested document to determine the format of the requested data, i.e., the source document data format. With the source document data format and the target document data format, i.e., the MIME type received in the original request, filter server 315 builds a filter for converting the format of source document to the format of the target document.

In the embodiment of FIG. 3, filter server 315 passes the request to a conversion service 310 that in turn accesses a filter registry 311 to generate a filter map of partial filter adapters that can be chained together to convert the format of the requested document to the MIME type specified in the request. Using the filter map, conversion service 310 calls a service to instantiate each partial filter adapter in the map using partial filter adapter library 312. Conversion service 310 calls another service to chain the partial filter adapters together using a chaining application programming interface of each partial filter adapter.

In this embodiment, filter server 315 via conversion service 310 constructs a data filter by gluing a protocol read and parser unit to an input end of the partial filter adapter chain and a bit stream printer and protocol writer to an output end of the chain. After construction of the data filter, conversion service 310 uses the data filter to process the requested document, e.g., the spreadsheet. The data filter generates data with a MIME type that can be input to the presentation scheme that is returned to portlet manager 113, which in turn processes the data as described above.

One important aspect of filter server 315 is that each partial filter adapter utilizes the same generic format independent interface to input the converted data. This allows any one partial filter adapter to be connected to another partial filter adapter without concern for the particular format of the data output by the first partial filter adapter.

In one embodiment, the data filter is used dynamically, which means that the complete data file is not stored in the intermediate formats. Rather, the output from a first partial filter adapter is input to a second partial filter adapter before all the data has been processed by the first partial filter adapter.

A more complete description of filter server 315, and each of the components therein is provided in commonly filed and commonly assigned U.S. patent application Ser. No. 09/759, 742, entitled "A METHOD AND STRUCTURE FOR DYNAMIC CONVERSION OF DATA," of Ralf Hofmann and Michael Hönnig, which is incorporated herein by reference in it entirety. In another embodiment, filter server 315 provides information about the dynamic filter to portlet manager 113, and portlet manager 113 stores a new presentation scheme on unit 302 that includes the dynamic filter generated by filter server 315, or at least a handle to the dynamic filter, and the retrieved presentation scheme.

While in FIG. 3 filter server 315 is illustrated as being included within presentation manager server system 100, this is illustrative only. Filter server 315 can be in another computer system, part of a portal, or even on the user device. Portlet manager 113 is coupled to filter server 315 to send and receive the information described above.

In one embodiment, the URL in the request from the user device is of the form:

http://<server>:<port>/portlet/<command string>?<parameters>.

In this embodiment, the command strings are: load; channel; article; and save. Command load loads information about the requested data. With command save, the user device submits settings made by the user that are to be saved along with the user data. To provide the content of a portlet to a user device, command channel is submitted. Command article is submitted to retrieve an article of a portlet.

Figure 5:
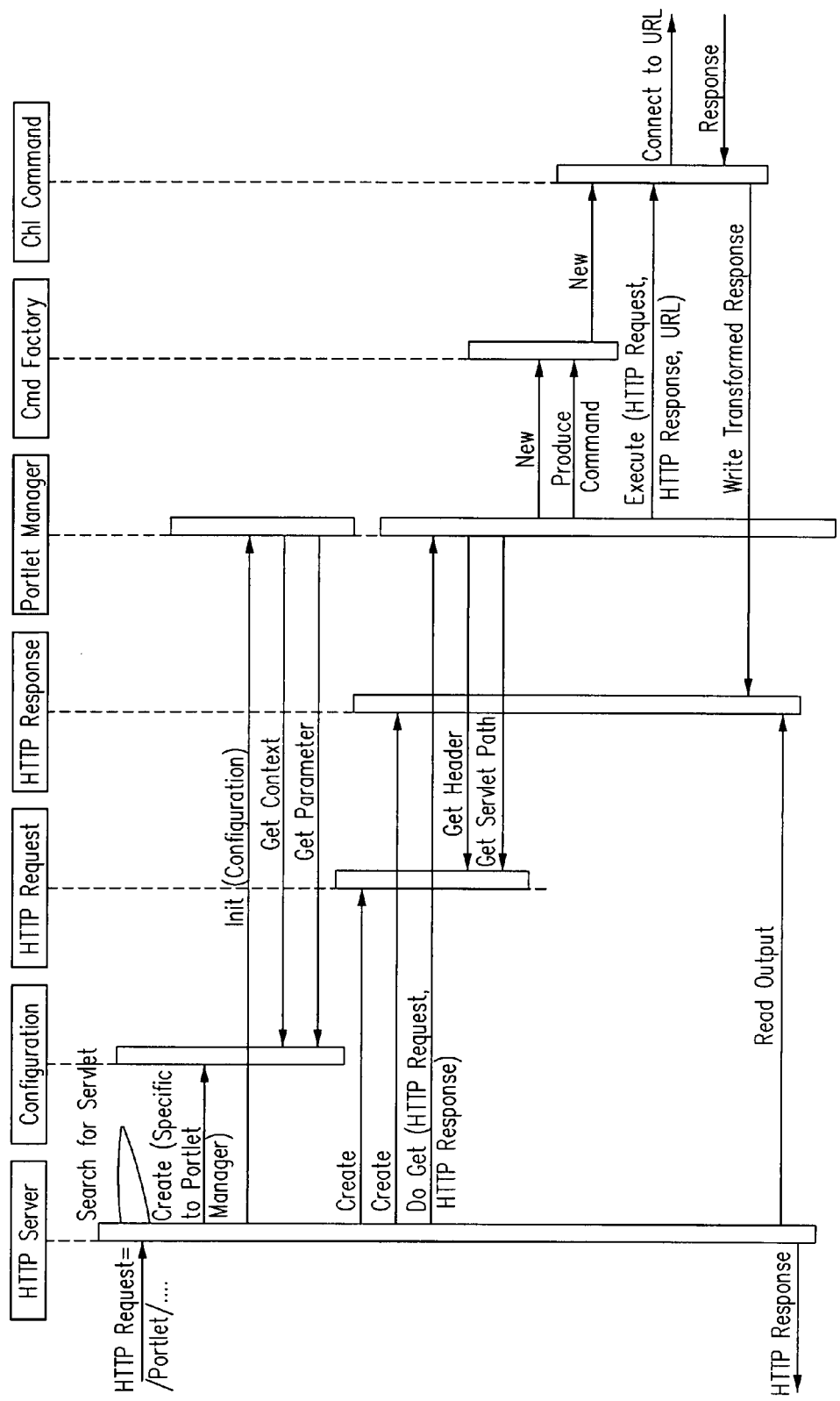
FIG. 5 is sequence diagram for the portlet manager according to one embodiment of the present invention.

FIG. 5 is sequence diagram for one embodiment of portlet manager 113. Along the horizontal axis are individual objects, where each object is represented as a labeled rectangle. The vertical axis represents the passage of time from top to bottom of the page. Horizontal lines represent the passing of messages between objects. A dashed line extends down from each rectangle, and a rectangle along the dashed line represents the lifetime of the object.

When web server 111 receives a URL that specifies a portlet, web server 111 searches for the servlet that is portlet manager 113. If portlet manager 113 has not been loaded, web server 111 first creates a configuration object specific to portlet manager 113, and then calls a portlet manager initialization method with the configuration object as an input.

After portlet manager 113 is initialized, portlet manager 113 first issues a get context message to the configuration object, and then issues a get parameters object message to the configuration object. In the embodiment of FIG. 6, the configuration path names are loaded to XSL and XML files. The creation and initialization messages are issued by web server 111 only once for the purpose of initialization. Subsequently, the search for the servlet that is portlet manager 113 finds portlet manager 113.

In this embodiment, HTTP Post and Get requests that are included in the request from the user device are passed to portlet manager 113 from web server 111 each time either request arrives at web server 111 for a portlet for which portlet manager 113 was configured initially. Specifically, when a user requests includes a HTTP Get request, web server 111 creates a HTTP request object for portlet manager 113, and a HTTP response object for portlet manager 113 as illustrated in FIG. 5. Web server 111 next calls a method do Get, with the HTTP request object and the HTTP response object as inputs, in portlet manager 113.

In response to the call to method do Get, portlet manager 113 issues calls to methods get header and get servlet path of the HTTP request object. Portlet manager 113 builds a string that specifies the URL of the portlet based on the information in the request from the user device. See FIGS. 7A to 7B for one embodiment of HTTP Get and Post commands and method do Get.

Once the URL is built, portlet manager 113 instantiates a new command factory using a class CommandFactory, and then calls a method produce command in the command factory with the HTTP request object as an input. Method produce command extracts the command string from the URL as given above and instantiates a channel command object when the command string is either channel or article; a load command object when the command string is load; and a save command object when the command string is save. The method produce command returns the command object.

One embodiment of class CommandFactory that includes method producecommand is presented in FIGS. 8A to 8B. One embodiment of class LoadCommand is presented in FIGS. 9A to 9E. An embodiment of class SaveCommand is presented in FIGS. 10A to 10B.

In the following discussion, it is assumed that the request issued by the user device included command article or command channel and so the channel command object was created. In this case, portlet manager 113 in method do Get calls method execute in the channel command object with inputs of the HTTP request object, the HTTP response object and the URL. FIGS. 11A to 11J are one embodiment of class ChannelCommand that includes method execute.

In method execute, the URL that is input is checked to determine whether a portlet is specified. If the URL does not specify a portlet, an URL container is accessed and information about all available portlets is obtained from the URL container. If a portlet is specified, the part of the URL that specifies the portlet is used to build a URL object that in turn is used to make a connection to retrieve the requested content.

After the URL object is created, all fields in the HTTP request object are copied to the new request that actually is sent to retrieve the requested content. These fields can include, for example, the name of the browser in the user device. The MIME types in the original request as well as the MIME types supported by portlet manager 113 are included in the new request. Upon completion of the new request, method execute uses the URL object to make a connection and to retrieve the requested content.

If the connection uses the HTTP protocol, information in the HTTP header can be used to recognize the MIME type of the response content. If the protocol is not HTTP, the extension of the URL is checked to determine the type of the response content. If the extension of the URL is .xml, a guess is made of what type of XML file is requested vy analyzing a filed DOCTYPE in the header of the XML file. In the case that an XML file based on a certain document type definition is recognized, the response type is set to the name associated with the document type definition. If the response is not an XML file, the URL connection object guesses the content type of the response content. This is done by a JAVA URLConnnection object that is part of the JAVA runtime environment, which is incorporated herein by reference to show the level of skill in the art.

In this embodiment, if the response content type is other than an XML format supported by portlet manager 113, the retrieved content without any modification is returned as the response to the request from the user device. In the embodiment of FIG. 2B, this does not occur, because the user device would not have access to such a portlet.

If the request was a HTTP request, and no preferred MIME type was specified, the preferred MIME type associated with the user is used. If the request failed to specify a device type, the device type associated with the user is used. If the request was for an XML file, and the XML parameter that specified the stylesheet in the original request was not used, a channel XSL-stylesheet is used if the command in the original request was command channel, and an article XSL style sheet is used if the command in the original command was command article. If the original request specified an XSL-stylesheet, this stylesheet is used. (See FIG. 4.)

A path to the appropriate XSL-stylesheet is built by method execute using the specified MIME type, device type and XSL-stylesheet. If a user device specific XSL-stylesheet cannot be found at this location, a generic device independent stylesheet is used based upon the specified MIME type. In this embodiment, there is an XSL-stylesheet for mapping each source MIME type to each user device MIME type. Thus, for a portlet with two possible MIME types and a user device that supports two possible MIME types, four XSL-stylesheets are needed.

With the specification of the XSL-stylesheet and the XML content, all the objects needed for the XSL transformation are set. The received content is parsed as an XML document and the whole document is held as a Document Object Model tree in memory. The XSL-stylesheet is parsed and loaded into memory.

If the loaded document is a list of portlets because portlet was specified in the original URL, or has a MIME type that is not accepted by the user device, the document is modified in a memory to which the user is not subscribed. This is necessary, because such content could not be displayed on the user device.

If the loaded document is an article, it is checked whether this MIME type is accepted as a response by the user device. Next, the global parameters for the XSL transformation are set, and the loaded XML document is transformed according to the rules in the XSL-stylesheet. The output of the transform is streamed to the HTTP response object.

Figure 12:
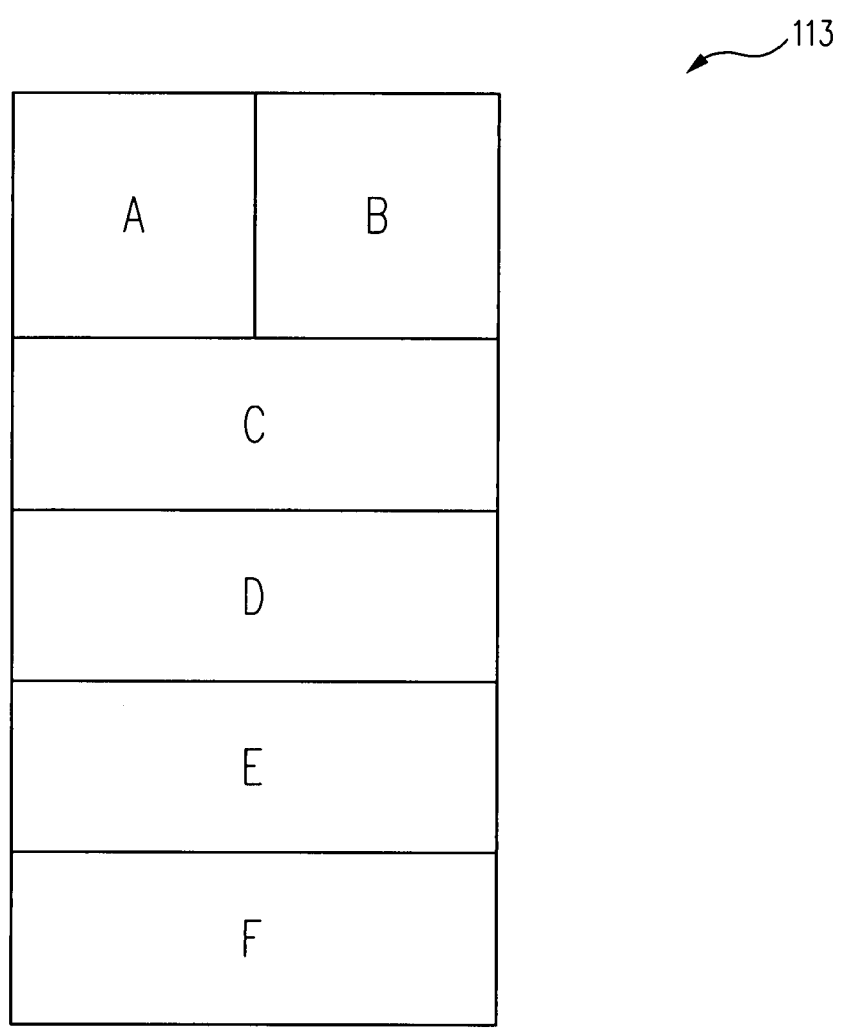
FIG. 12 is a block diagram of modules in the portlet manager according to one embodiment of the present invention.

FIG. 12 shows an example of a portlet manager 113 according to the present invention as described above. Portlet manager 113 comprises, in this example, six modules. Module A is a receiving module for receiving a request of the user device. Module B is an identifying module for identifying the presentation requirements of the user device. These two modules are able to communicate with the selecting module C to enable module C to select a presentation scheme for the requested data in accordance with the presentation requirements of the user device In the present example, portlet manager 113 comprises also a retrieving module D for retrieving the requested data. Applying module E applies the presentation scheme selected by module C to the data to create presentable data, which may be presented by the user device. This presentable data is submitted by a transmitting module E to the user device. Modules D, E and F need not be part of portlet manager 113. Modules D, E and F or some of them may also reside on the user device or on a computer system connected to the user device.

In view of this disclosure, various alternative embodiments will be apparent to those of skill in the art. For example, in the above embodiment, data was retrieved by presentation manager 113, and presentation manager 113 applied the selected presentation scheme to the data. In another embodiment of the present invention, the data may be retrieved by the user device itself. Then, the selected presentation scheme may be applied by the user device or by the presentation manager 113. The latter, for example, would apply if the data retrieved by the user device were transferred to presentation manager 113 for applying the selected presentation scheme and then re-transferred to the user device.

Those skilled in the art will readily understand that the operations and actions described herein represent actions performed by a CPU of a computer in accordance with computer instructions provided by a computer program. Therefore, presentation manager 113 and any associated portlets may be implemented by a computer program causing the CPU of the computer to carry out instructions representing the individual operations or actions as described above. The computer instructions can also be stored on a computer-readable medium, or they can be embodied in any computer-readable medium such as any communications link, like a transmission link to a LAN, a link to the Internet, or the like.

Thus, presentation manager 113, portlets, or any combination of the two, can be implemented by a computer program comprising computer program code or application code. This application code or computer program code may be embodied in any form of a computer program product. A computer program product comprises a medium configured to store or transport this computer-readable code, or in which this computer-readable code may be embedded. Some examples of computer program products are storage media, such as CD-ROM discs, ROM cards, floppy discs, magnetic tapes, computer hard drives, servers on a network, and transmission media, such as carrier waves. The transmission media may also comprise signals, which do not use carrier waves, such as digital signals transmitted over a network (including the Internet) without the use of a carrier wave.

The storage medium including the presentation manager and/or portlets executed on a server may belong to presentation manager server system 100 itself. However, the storage medium also may be removed from presentation manager server system 100. The only requirement is that the program code for these objects is accessible by system 100 so that the computer code can be executed by system 100 in the embodiment of FIG. 1A.

Herein, a computer memory refers to a volatile memory, a non-volatile memory, or a combination of the two in any one of these devices. Similarly, a computer input unit and a display unit refer to the features providing the required functionality to input the information described herein, and to display the information described herein, respectively, in any one of the aforementioned or equivalent devices.

While the present invention has been explained in connection with certain embodiments thereof, other embodiments will be apparent to those skilled in the art from consideration of the specification and practice of the invention disclosed therein. It is intended that the specification and examples be considered as exemplary only, without limiting the spirit and scope of the invention.

We claim:

1. A method for providing data to a user device comprising:
- receiving a request from a user device generated by selection of a portlet identification object on the user device by a web server, wherein said request includes at least a description of said data, a command for acting on said data, and information identifying presentation requirements of said user device;
- analyzing said request by said web server determine whether said request is for content associated with a portlet;
- transferring said request to a presentation manager upon determining that said request is for said content associated with a portlet;
- passing said request to said portlet by said presentation manager wherein said portlet retrieves data specified in said request over a network and further wherein said data has a source MIME type;
- analyzing said information present in said request to identify a preferred user MIME type;
- selecting a presentation scheme specific to said user device from a plurality of presentation schemes based upon said preferred user MIME type and said source MIME type, wherein each presentation scheme in said plurality of presentation schemes is for a user device and is the totality of the configuration information needed to extract said data from a first format and transform said data into new data for presentation of a user device associated with said each presentation scheme; and
- converting said data from said source MIME type to said preferred user MIME type using said presentation scheme; and
- transmitting said data converted from said source MIME type to said preferred user MIME type to said user device to allow the presentation of said data converted from said source MIME type to said preferred user MIME type on said user device.

2. The method of claim 1, wherein said selecting a presentation scheme comprises selecting an XSL-stylesheet.

3. The method of claim 1, wherein said command is selected from a group of commands consisting of load, save, article, and channel.

4. The method of claim 1, wherein said command is a command article.

5. The method of claim 1, wherein said command is a command channel.

6. A storage medium having stored thereon computer instructions for a method comprising:
- receiving a request from a user device generated by selection of a portlet identification object on the user device by a web server, wherein said request includes at least a description of said data, a command for acting on said data, and information identifying presentation requirements of said user device;
- analyzing said request by said web server to determine whether said request is for content associated with a portlet;
- transferring said request to a presentation manager upon determining that said request is for said content associated with a portlet;
- passing said request to said portlet by said presentation manager wherein said portlet retrieves data specified in said request over a network and further wherein said data has a source MIME type;
- analyzing said information present in said request to identify a preferred user MIME type;
- selecting a presentation scheme specific to said user device from a plurality of presentation schemes based upon said preferred user MIME type and said source MIME type, wherein each presentation scheme in said plurality of presentation schemes is for a user device and is the totality of the configuration information needed to extract said data from a first format and transform said data into new data for presentation on a user device associated with said each presentation scheme; and
- converting said data from said source MIME type to said preferred user MIME type using said presentation scheme; and
- transmitting said data converted from said source MIME type to said preferred user MIME type to said user device to allow the presentation of said data converted from said source MIME type to said preferred user MIME type on said user device.

* * * * *

UNITED STATES PATENT AND TRADEMARK OFFICE
CERTIFICATE OF CORRECTION

| | | |
|---|---|---|
| PATENT NO. | : 7,281,060 B2 | Page 1 of 1 |
| APPLICATION NO. | : 09/759744 | |
| DATED | : October 9, 2007 | |
| INVENTOR(S) | : Hoffmann et al. | |

It is certified that error appears in the above-identified patent and that said Letters Patent is hereby corrected as shown below:

Column 19, Claim 1, Line 9, between "server" and "determine", insert --to--; line 28, following "presentation", change "of" to read --on--.

Signed and Sealed this

Eighteenth Day of December, 2007

JON W. DUDAS
*Director of the United States Patent and Trademark Office*